United States Patent
Ardo et al.

(10) Patent No.: US 11,912,589 B2
(45) Date of Patent: Feb. 27, 2024

(54) OPTICALLY THIN LIGHT-ABSORBERS FOR INCREASING PHOTOCHEMICAL ENERGY-CONVERSION EFFICIENCIES

(71) Applicant: THE REGENTS OF THE UNIVERSITY OF CALIFORNIA, Oakland, CA (US)

(72) Inventors: Shane Ardo, Irvine, CA (US); Samuel Thomas Keene, Irvine, CA (US); Gabriel S. Phun, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 692 days.

(21) Appl. No.: 16/673,680

(22) Filed: Nov. 4, 2019

(65) Prior Publication Data
US 2020/0140293 A1    May 7, 2020

Related U.S. Application Data

(60) Provisional application No. 62/755,410, filed on Nov. 2, 2018.

(51) Int. Cl.
*C02F 1/46*     (2023.01)
*C25B 1/04*     (2021.01)
(Continued)

(52) U.S. Cl.
CPC ........ *C02F 1/4604* (2013.01); *C02F 1/46104* (2013.01); *C25B 1/04* (2013.01);
(Continued)

(58) Field of Classification Search
CPC ..... C25B 1/04; C25B 1/55; C25B 9/50; C02F 2305/10
See application file for complete search history.

(56) References Cited

U.S. PATENT DOCUMENTS 6,878,287 B1    4/2005  Marais
8,764,957 B2    7/2014  Sui et al.
(Continued)

FOREIGN PATENT DOCUMENTS

CN    109937462 A    6/2019
WO    2018049061 A1   3/2018

OTHER PUBLICATIONS

'Silicon'. Wikipedia. Oct. 28, 2018 (Oct. 28, 2018). p. 1-3, [retrieved Mar. 26, 2020 2 (Mar. 26, 2020) from <https:llen.wikipedia.org/w/index.php?title=Silicon&oldid=866163635>].
(Continued)

*Primary Examiner* — Salil Jain
(74) *Attorney, Agent, or Firm* — NGUYEN TARBET LLC

(57) ABSTRACT

Photochemical energy conversion is more efficient when a single light-absorbing unit is split into multiple light-absorbing units (N) that are each 1/N as thick as the single light-absorbing unit and thus use the same amount of material as the single light-absorbing unit. For electrocatalytic parameters relevant to water electrolysis, the maximum efficiency for solar-to-fuel conversion from a 1.75 eV bandgap material increases from approximately 1% for a single light-absorbing unit to greater than 20% for 128 identical stacked light-absorbing units. Alterations in utilization of photons results in a better match of the light-absorber power output to the load of the chemical transformation and in the case of high-quality light-absorbers there is an added benefit from radiative coupling between the light-absorbing units via photon recycling.

11 Claims, 27 Drawing Sheets
(27 of 27 Drawing Sheet(s) Filed in Color)

(51) Int. Cl.
   *C02F 1/461* (2023.01)
   *C25B 1/55* (2021.01)
   *C25B 9/50* (2021.01)
(52) U.S. Cl.
   CPC .................. *C25B 1/55* (2021.01); *C25B 9/50* (2021.01); *C02F 2305/10* (2013.01)

(56) References Cited

U.S. PATENT DOCUMENTS

| | | | |
|---|---|---|---|
| 2007/0099055 | A1 | 5/2007 | Lee et al. |
| 2008/0213641 | A1 | 9/2008 | Ostermann et al. |
| 2012/0097541 | A1 | 4/2012 | Yazdanbod |
| 2013/0041353 | A1 | 2/2013 | Shin et al. |
| 2013/0168228 | A1 | 7/2013 | Ozin et al. |
| 2016/0289848 | A1* | 10/2016 | Moser ................ C25B 1/55 |
| 2016/0310899 | A1 | 10/2016 | Bordain et al. |
| 2017/0213653 | A1* | 7/2017 | Baniecki ............ H01G 9/2036 |
| 2018/0065095 | A1 | 3/2018 | Ardo et al. |

OTHER PUBLICATIONS

'Optical Properties of Silicon'. PVEDUCATION, May 25, 2018 (May 25, 2018). p. 1-3. [retrieved 27 4.9 Mar. 2020 (Mar. 27, 2020) from<https:llweb.archive.orglweb/20 180525182157/https:Jlwww . pveducation .org/pvcdrom/materialsloptical-properties-of-silicon> ].

Chambers et al., "Efficient Photochemical Dihydrogen Generation Initiated by a Bimetallic Self-Quenching Mechanism" J. Am. Chem. Soc. 2016, 138, 13509-13512.

Stewart et al. "Accelerating slow excited state proton transfer" PNAS. 2013, vol. 110, No. 3, 876-880.

Helmut Tributsch. "Light Driven Proton Pumps" Ionics. 2000, 6, 161-171.

Steinberg-Yfrach et al. "Conversion of light energy to proton potential in liposomes by artificial photosynthetic reaction centres" Nature. 1997, 385, 239-241.

Xie et al. "Photocurrent generation based on a light-driven proton pump in an artificial liquid membrane" Nature Chemistry. Published Online: Feb. 2, 2014 | DOI: 10.1038/NCHEM.1858.

Kai Sun and David Mauzerall. "A simple light-driven transmembrane proton pump" Proc. Natl. Acad. Sci. USA, vol. 93, pp. 10758-10762, Oct. 1996.

Murphy. "Model Systems in Photoelectrochemical Energy Conversion" Solar Energy, 1978, vol. 21, pp. 403-407.

Sanborn and Ardo. "Photoelectrochemical Ion Pumping with Dye-Functionalized Polymer Membranes" in Electrochemical Society (ECS), Spring National Meeting, Chicago, IL, May 27, 2015.

White et al., "Sunlight-Driven Ionic Power Generation from Bipolar Ion-Exchange Membranes Functionalized with Photoacids" in Electrochemical Society (ECS), Spring National Meeting, San Diego, CA, May 29, 2016.

White et al., "Observation of Photovoltaic Action from Photoacid-Modified Nafion Due to Light-Driven Ion Transport" J. Am. Chem. Soc., 2017, 139 (34), pp. 11726-11733.

Li et al., Energy Environ. Sci. 2012, 5, 7888-7892.

Wang et al., Electrochem. Soc. 2016, 163 (8), F824-F831.

Lashkaryov, V. E. Investigations of a Barrier Layer by the Thermoprobe Method. Izv. Akad. Nauk SSSR, Ser. Fiz. 1941, 5 (4-5), 442-446.

Fuller, C. S. Some Analogies Between Semiconductors and Electrolyte Solutions. Rec. Chem. Prog. 1956, 17 (2), 75-93.

Chapin et al., A New Silicon P-n Junction Photocell for Converting Solar Radiation into Electrical Power. J. Appl. Phys. 1954, 25 (5), 676-677.

Lovrecek et al., J. O. Electrolytic Junctions with Rectifying Properties. J. Phys. Chem. 1959, 63, 750.

Maslov, V.; Zotov, Y. Water as a Semiconductor. Russ. Chem. Rev. 1968, 37 (4), 310-315.

Pearson, G. L.; Bardeen, J. Electrical Properties of Pure Silicon and Silicon Alloys Containing Boron and Phosporus. Phys. Rev. 1949, 75 (5), 865.

Rosés et al., Autoprotolysis in Aqueous Organic Solvent Mixtures. Anal. Chem. 1993, 1003 (23), 2294-2299.

Rondinini et al., Autoprotolysis Constants in Nonaqueous Solvents and Aqueous Organic Solvent Mixtures. Pure Appl. Chem. 1987, 59 (12), 1693-1702.

Battaglia et al., High-Efficiency Crystalline Silicon Solar Cells: Status and Perspectives. Energy Environ. Sci. 2016, 9 (5), 1552-1576.

Shockley, W.; Queisser, H. J. Detailed Balance Limit of Efficiency of P-N Junction Solar Cells. J. Appl. Phys. 1961, 32 (3), 510-519.

Würthner et al., J-Aggregates: From Serendipitous Discovery to Supramolecular Engineering of Functional Dye Materials. Angew. Chemie Int. Ed. 2011, 50 (15), 3376-3410.

Ardo et al., Excited-State Electron Transfer from Ruthenium-Polypyridyl Compounds to Anatase TiO2 Nanocrystallites: Evidence for a Stark Effect. J. Phys. Chem. B 2010, 114 (45), 14596-14604.

Ardo et al., Stark Effects after Excited-State Interfacial Electron Transfer at Sensitized TiO2 Nanocrystallites. J. Am. Chem. Soc. 2010, 132 (19), 6696-6709.

Pensack et al., Ultrafast Vibrational Spectroscopy of Charge-Carrier Dynamics in Organic Photovoltaic Materials. Phys. Chem. Chem. Phys. 2009, 11 (15), 2575.

Zhang, F.; Zhang, H.; Qu, C. Imidazolium Functionalized Polysulfone Anion Exchange Membrane for Fuel Cell Application. J. Mater. Chem. 2011, 21 (34), 12744.

Wang, G.; Weng, Y.; Chu, D.; Xie, D.; Chen, R. Preparation of Alkaline Anion Exchange Membranes Based on Functional Poly(ether-Imide) Polymers for Potential Fuel Cell Applications. J. Memb. Sci. 2009, 326, 4-8.

Luo, J.; Wu, C.; Wu, Y.; Xu, T. Diffusion Dialysis of Hydrochloride Acid at Different Temperatures Using PPO-SiO2 Hybrid Anion Exchange Membranes. J. Memb. Sci. 2010, 347, 240-249.

Khan, M. I.; Mondal, A. N.; Tong, B.; Jiang, C.; Emmanuel, K.; Yang, Z.; Wu, L.; Xu, T. Development of BPPO-Based Anion Exchange Membranes for Electrodialysis Desalination Applications. Desalination 2016, 391, 61-68.

Merle, G.; Wessling, M.; Nijmeijer, K. Anion Exchange Membranes for Alkaline Fuel Cells: A Review. J. Memb. Sci. 2011, 377 (1-2), 1-35.

Reiter, R. S.; White, W.; Ardo, S. Electrochemical Characterization of Commercial Bipolar Membranes under Electrolyte Conditions Relevant to Solar Fuels Technologies. J. Electrochem. Soc. 2016, 163 (4), H3132-H3134.

Ünlü, M.; Zhou, J.; Kohl, P. A. Hybrid Anion and Proton Exchange Membrane Fuel Cells. J. Phys. Chem. C 2009, 113 (26), 11416-11423.

Grew, K. N.; McClure, J. P.; Chu, D.; Kohl, P. A.; Ahlfield, J. M. Understanding Transport at the Acid-Alkaline Interface of Bipolar Membranes. J. Electrochem. Soc. 2016, 163 (14), F1572-F1587.

Warrick, P.; Auborn, J. J.; Eyring, E. M. Viscosity Effects on Ion-Recombination Kinetics. Bromocresol Green in Water-Glycerol Mixtures. J. Phys. Chem. 1972, 76 (8), 1184-1191.

Hegedus, L.; Kirschner, N.; Wittmann, M.; Noszticzius, Z. Electrolyte Transistors: Ionic Reaction-Diffusion Systems with Amplifying Properties. J. Phys. Chem. A 1998, 102 (32), 6491-6497.

Spry, D. B.; Fayer, M. D. Proton Transfer and Proton Concentrations in Protonated Nafion Fuel Cell Membranes. J. Phys. Chem. B 2009, 113 (30), 10210-10221.

Eames, C.; Frost, J. M.; Barnes, P. R. F.; O'Regan, B. C.; Walsh, A.; Islam, M. S. Ionic Transport in Hybrid Lead Iodide Perovskite Solar Cells. Nat. Commun. 2015, 6, 7497.

Bag, M.; Renna, L. A.; Adhikari, R. Y.; Karak, S.; Liu, F.; Lahti, P. M.; Russell, T. P.; Tuominen, M. T.; Venkataraman, D. Kinetics of Ion Transport in Perovskite Active Layers and Its Implications for Active Layer Stability. J. Am. Chem. Soc. 2015, 137 (40), 13130-13137.

Fabian, D. M.; Ardo, S.; An, C. Y.; Pepe, I.; Oliveira, N. B. De; Silva, A. V. B. Da; Gray-Weale, A.; Bach, J.; Cheng, Y.-B.; Spiccia,

(56) References Cited

OTHER PUBLICATIONS

L.; et al. Hybrid Organic-inorganic Solar Cells Based on Bismuth Iodide and 1,6-Hexanediammonium Dication. J. Mater. Chem. A 2016, 4 (18), 6837-6841.

Chen, H.; Gratton, E.; Digman, M. A. Spectral Properties and Dynamics of Gold Nanorods Revealed by EMCCD-Based Spectral Phasor Method. Microsc. Res. Tech. 2015, 78 (4), 283-293.

Ramírez, P.; Rapp, H. J.; Reichle, S.; Strathmann, H.; Mafé, S. Current-Voltage Curves of Bipolar Membranes. J. Appl. Phys. 1992, 72 (1), 259-264.

Mafé, S.; Ramírez, P.; Alcaraz, A. Electric Field-Assisted Proton Transfer and Water Dissociation at the Junction of a Fixed-Charge Bipolar Membrane. Chem. Phys. Lett. 1998, 294 (4-5), 406-412.

Mafé, S.; Ramírez, P. Electrochemical Characterization of Polymer Ion-Exchange Bipolar Membranes. Acta Polym. 1997, 48, 234-250.

International Search Report for PCT Application No. PCT/US17/50532 dated Nov. 3, 2017.

International Search Report Issued for PCT Application No. PCT/US19/24424 dated Jun. 14, 2019.

Kolbe, M. Science. 2000, 288, 1390-1396.

White, W. et al. Joule, 2018. 2, 94-109.

Reiter, R. Electrochemical evaluation of bipolar ion-exchange membranes for fuel cells . University of California, Irvine. M.S. Thesis. 2015. pp. 3, 25-27, 32, http://escholarship.org/contentlqt3pc416c6/qt3pc416c6.pdf>.

* cited by examiner

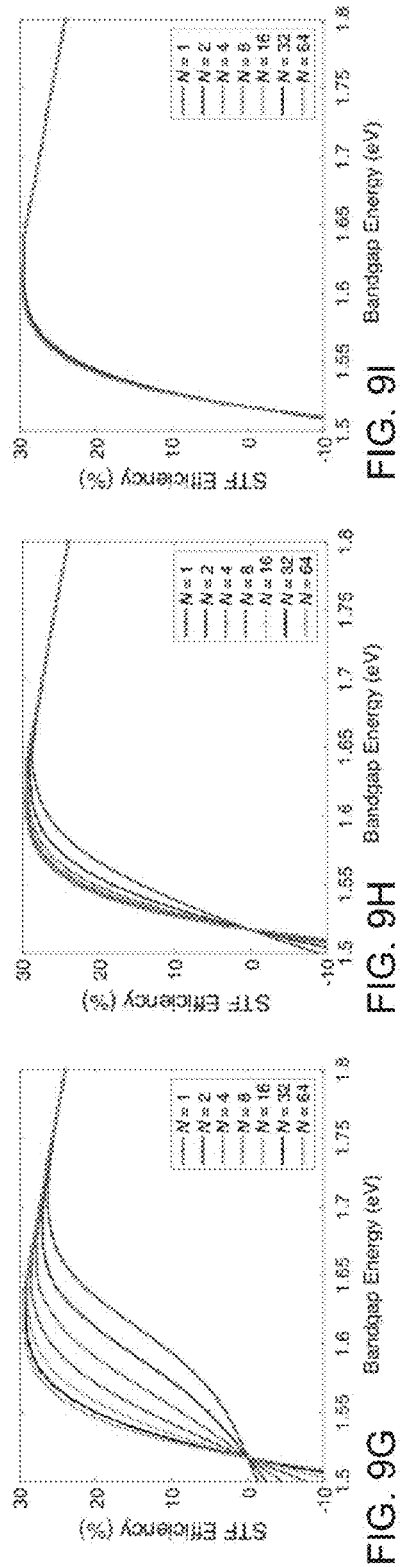
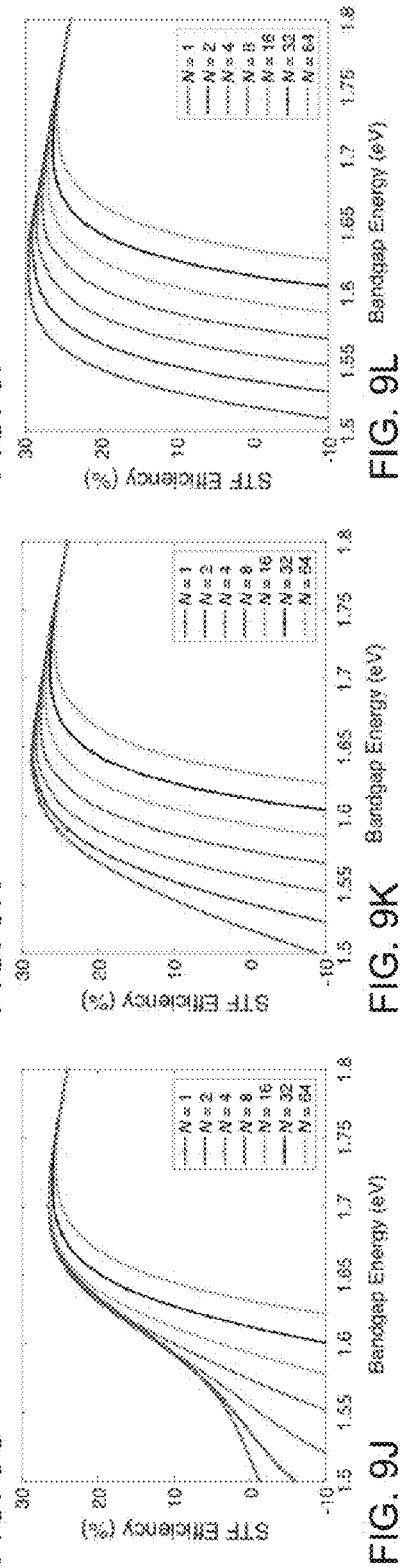
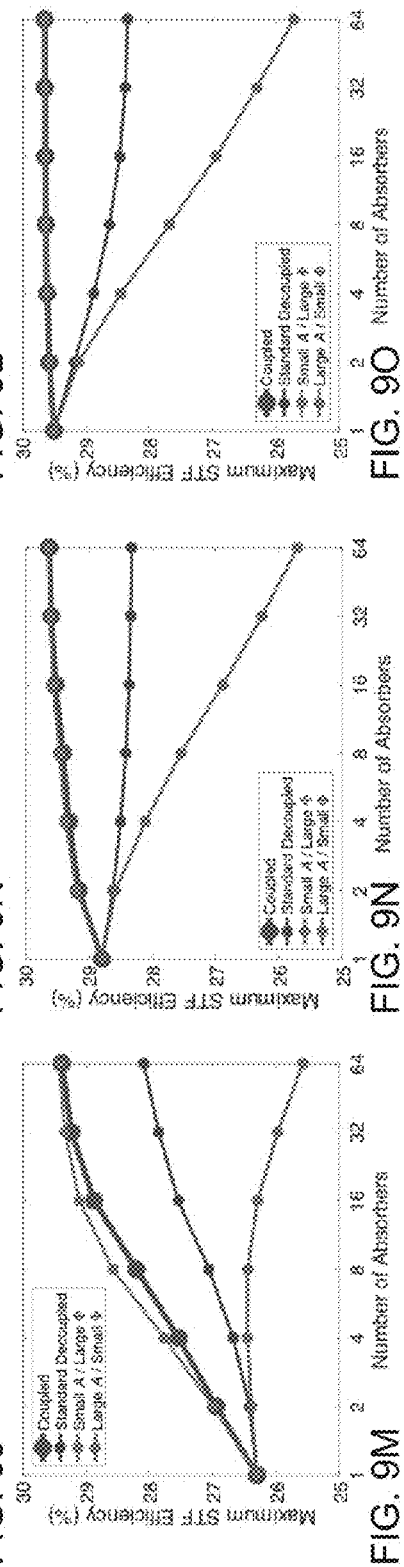
FIG. 9G, FIG. 9H, FIG. 9I, FIG. 9J, FIG. 9K, FIG. 9L, FIG. 9M, FIG. 9N, FIG. 9O

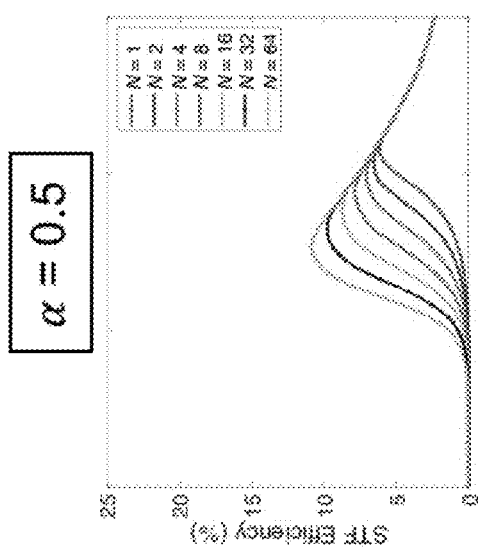
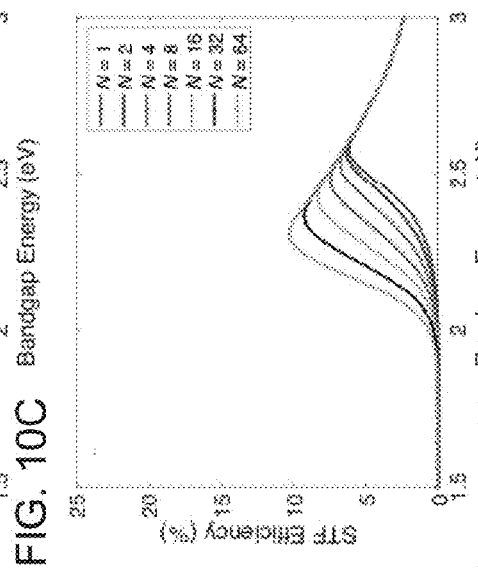
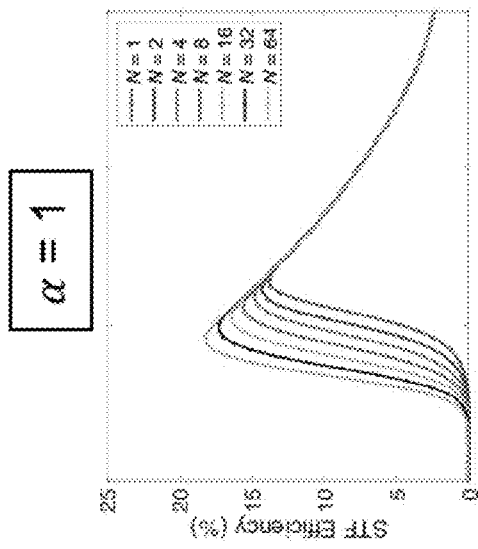
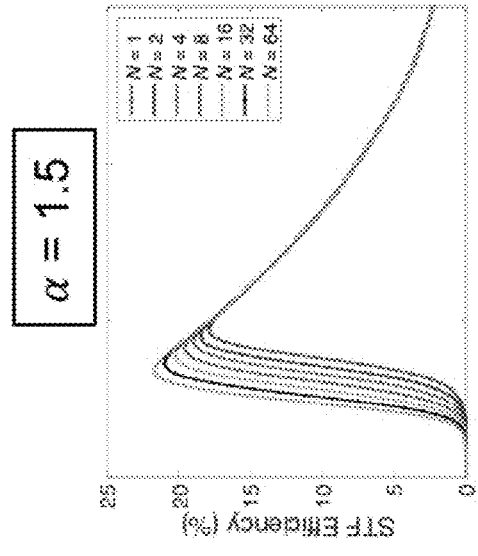
FIG. 10A  FIG. 10B  FIG. 10C  FIG. 10D  FIG. 10E  FIG. 10F

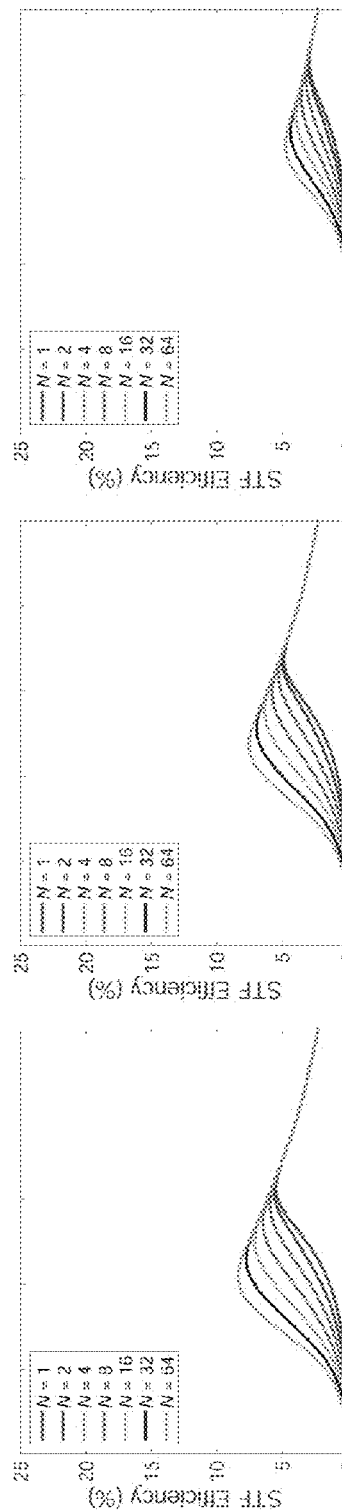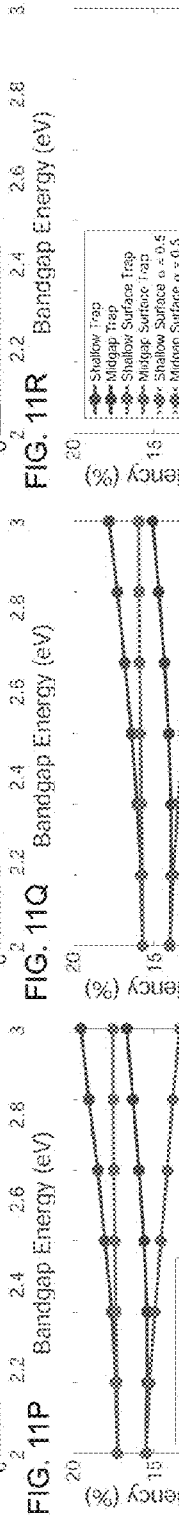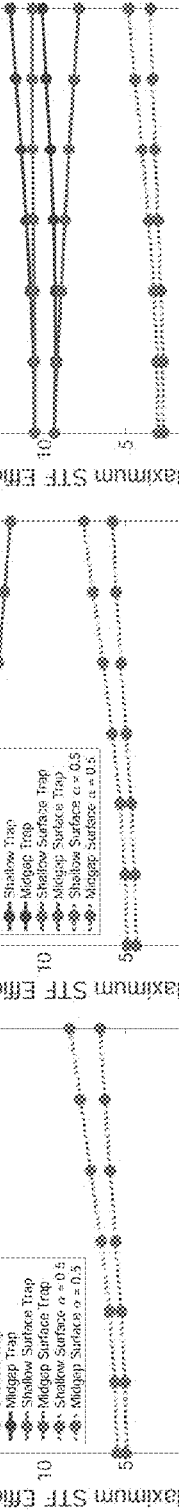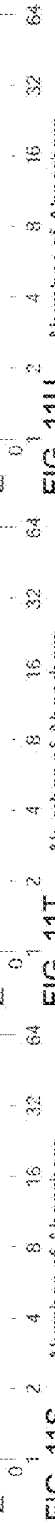

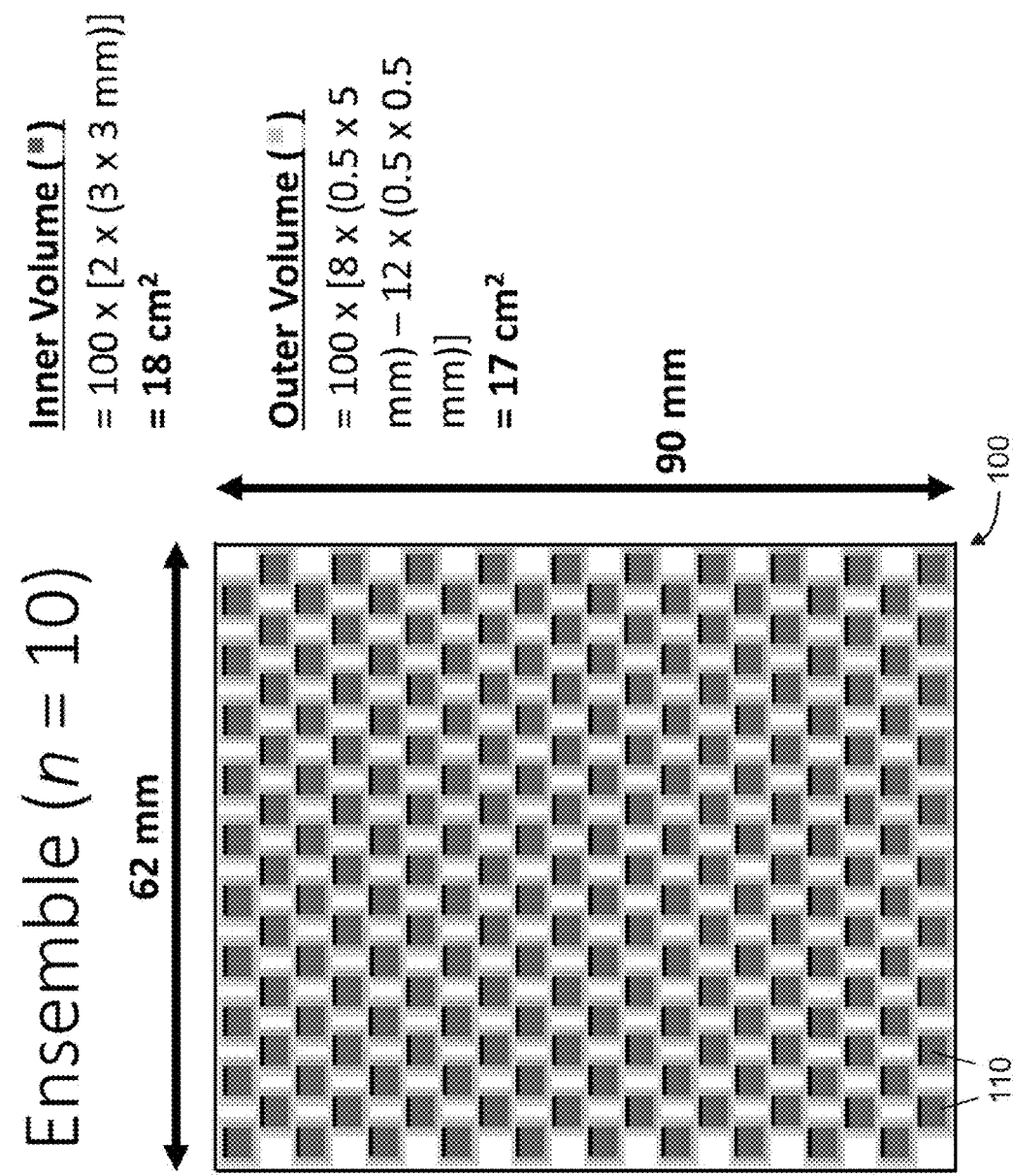

FIG. 13

**Ensemble (*n* = 10)**

Inner Volume (■)
= 100 × [2 × (3 × 3 mm)]
= 18 cm²

Outer Volume (□)
= 100 × [8 × (0.5 × 5 mm) − 12 × (0.5 × 0.5 mm)]
= 17 cm²

62 mm 90 mm

100

110

Conditions
- Total absorption is 90% of optimal sunlight absorption (90% × 46.4 mA/cm² ≈ 41.8 mA/cm²)
- $Conc_{inner,initial}$ = 100 mM
- $Conc_{outer,initial}$ = 100 mM
- $Conc_{inner,final}$ = 190 mM
- $Conc_{outer,final}$ = 10 mM
- 1 L of water is in 1 tube 0.588 meter (~1.9 ft) long with ~2.44" × 3.54" area

Assumptions
- Illumination is over the full width
- $Vol_{inner} = Vol_{outer}$
- White space is not water

Power and Load Curves (n = 1)

$t_{100mM \rightarrow 10mM}$ = 26.8 days n = 1

- Very large power curve, and thus largest $V_{oc}$ at ~330 mV
- Very resistive ion transport as the longest total ion transport distance
- **CONCLUSION: Intersection of the power curve and the load curve is at a very small current density even at the start of the desalination process (topmost orange line), and so photons are not being utilized well

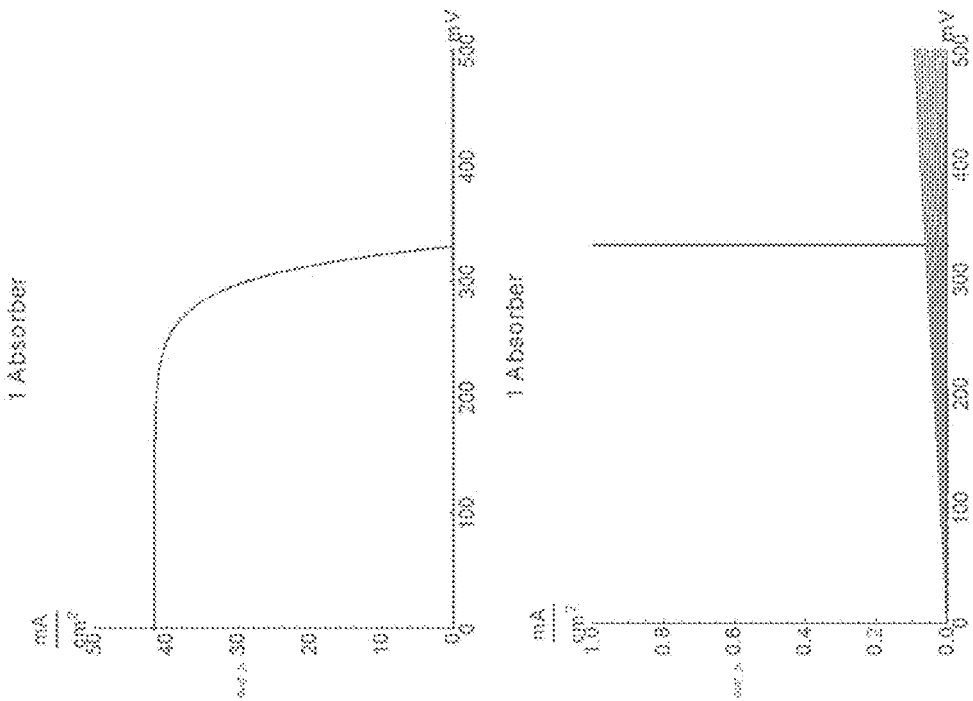

FIG. 15

Power and Load Curves ($n = 2$)

$$t_{100mM \rightarrow 10mM} = \underline{3.69 \text{ days}}$$

$n = 2$

- Power curves are still large
- Ion transport is still very resistive
- **CONCLUSION: Intersections of the power curves and the load curves occur at very small current densities even at the start of the desalination process (topmost orange line), and so photons are not being utilized well

Power and Load Curves ($n = 5$)

$t_{100mM \rightarrow 10mM} = 6.44$ hours

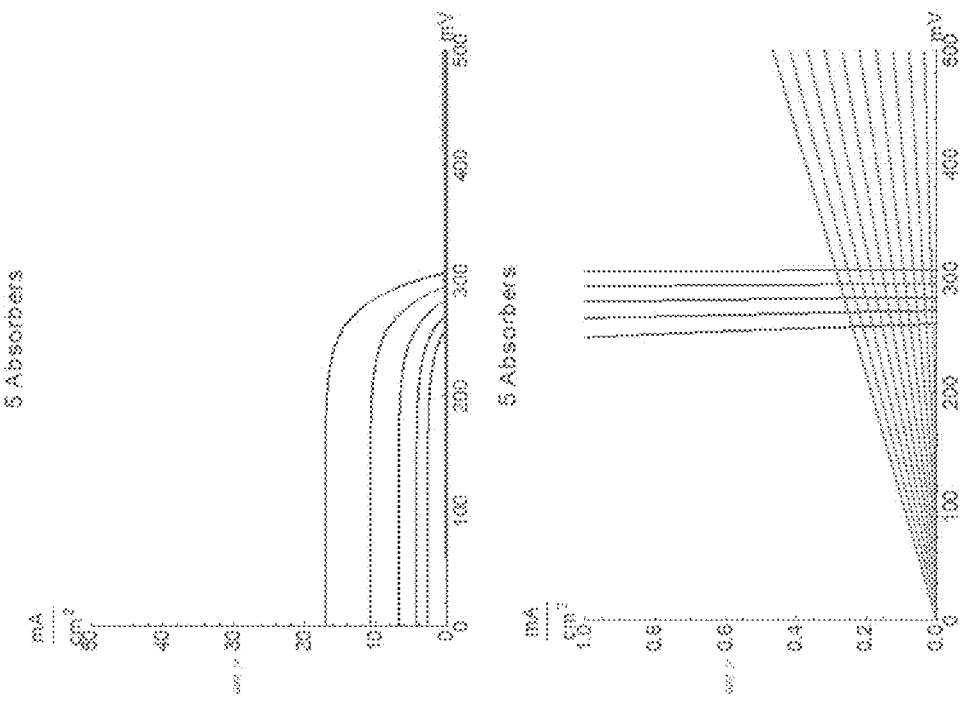

$\underline{n = 5}$

- Power curves are still large
- Ion transport is still *rather* resistive
- <u>CONCLUSION</u>: Intersections of the power curves and the load curves occur at very small current densities even at the start of the desalination process (topmost orange line), and so photons are not being utilized well

FIG. 17

Power and Load Curves ($n = 10$)

$$t_{100mM \rightarrow 10mM} = 53.814 \text{ minutes}$$

$n = 10$

- Power curves are still *rather* large
- Ion transport is still *rather* resistive

CONCLUSION:

Intersections of the power curves and the load curves occur at very small current densities even at the start of the desalination process (topmost orange line), and so photons are not being utilized well

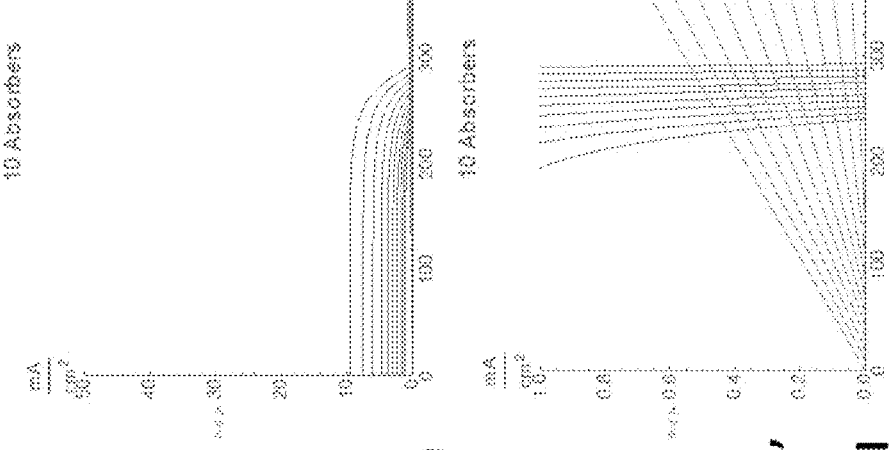

Ideal solar thermal distillation without heat recapture would require $(40.65 + 5.65 \text{ kJ/mol}) \times 55.5 \text{ mol/L} = 2,569.65 \text{ kJ/L}$, and with a peak solar irradiance of $0.1 \text{ W/cm}^2$ over $(58.8 \text{ cm} \times 6.2 \text{ cm}) = 0.036456 \text{ kJ/s}$, and thus the water generation rate is $70,486 \text{ s/L} = \underline{1,174.77 \text{ minutes (or } 21.8 \text{ times slower!)}}$ Distillation needs 95.42% heat recapture for the same rate

FIG. 18

Power and Load Curves ($n = 20$)
$t_{100mM \rightarrow 10mM} = 7.72384$ minutes

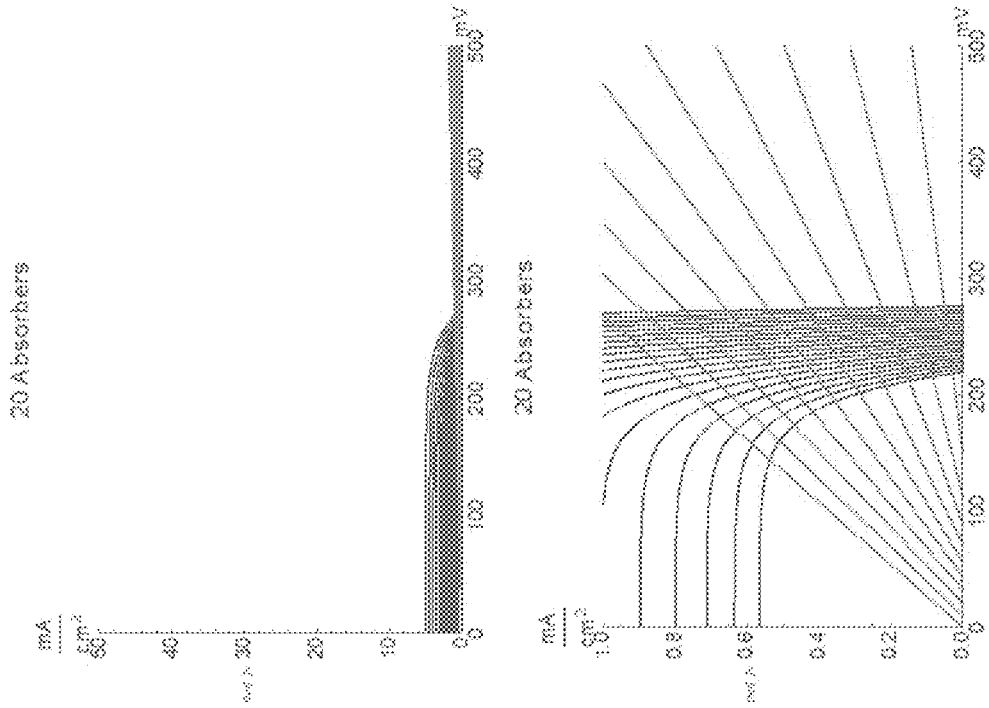

$n = 20$
- Smallest power curve is fairly small
- Ion transport is not as resistive at the start of the desalination process
- CONCLUSION: Intersection of the power curves and the load curves occur at a large fraction of the maximum current density at the start of the desalination process, and so there photons are being utilized well

FIG. 19

Power and Load Curves (n = 50)
$t_{100mM \rightarrow 10mM}$ = 44.7 seconds n = 50
- *Most power curves are fairly small*
- *Ion transport is not as resistive even near the end of the desalination process*
- CONCLUSION: Intersection of the power curves and the load curves occur at a large fraction of the maximum current density throughout the desalination process, and so photons are being utilized well

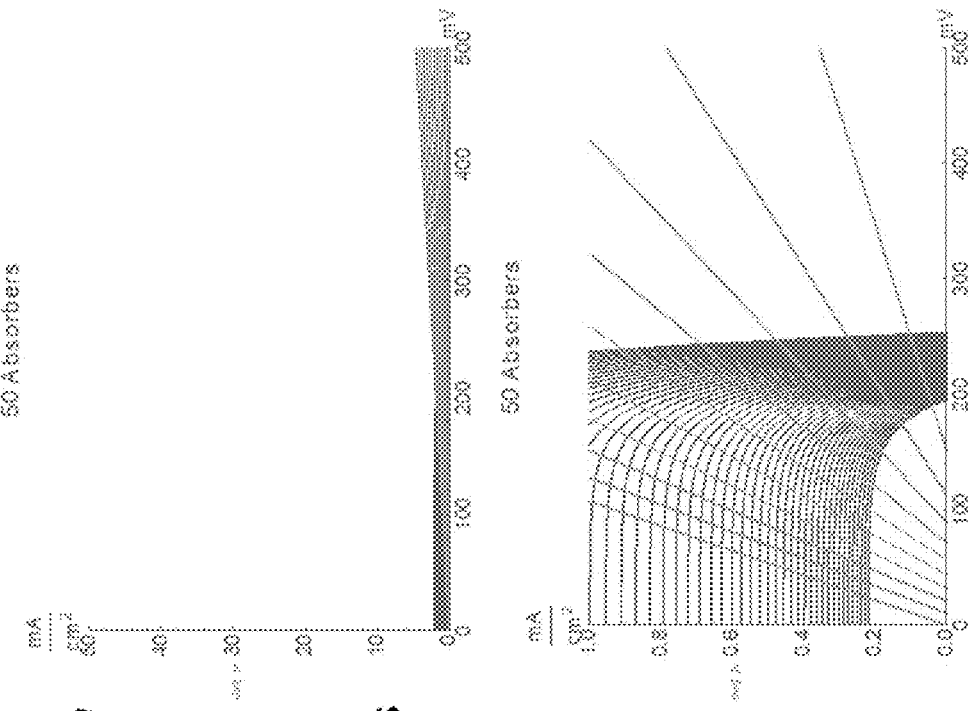

FIG. 20

Power and Load Curves ($n = 100$)
$t_{100mM \rightarrow 10mM} = \underline{12.8\ seconds}$ $\underline{n = 100}$
- *Most power curves are fairly small*
- *Ion transport is not as resistive even near the end of the desalination process*
- CONCLUSION: *Intersection of the power curves and the load curves occur at a large fraction of the maximum current density throughout the desalination process, and so photons are being utilized well*

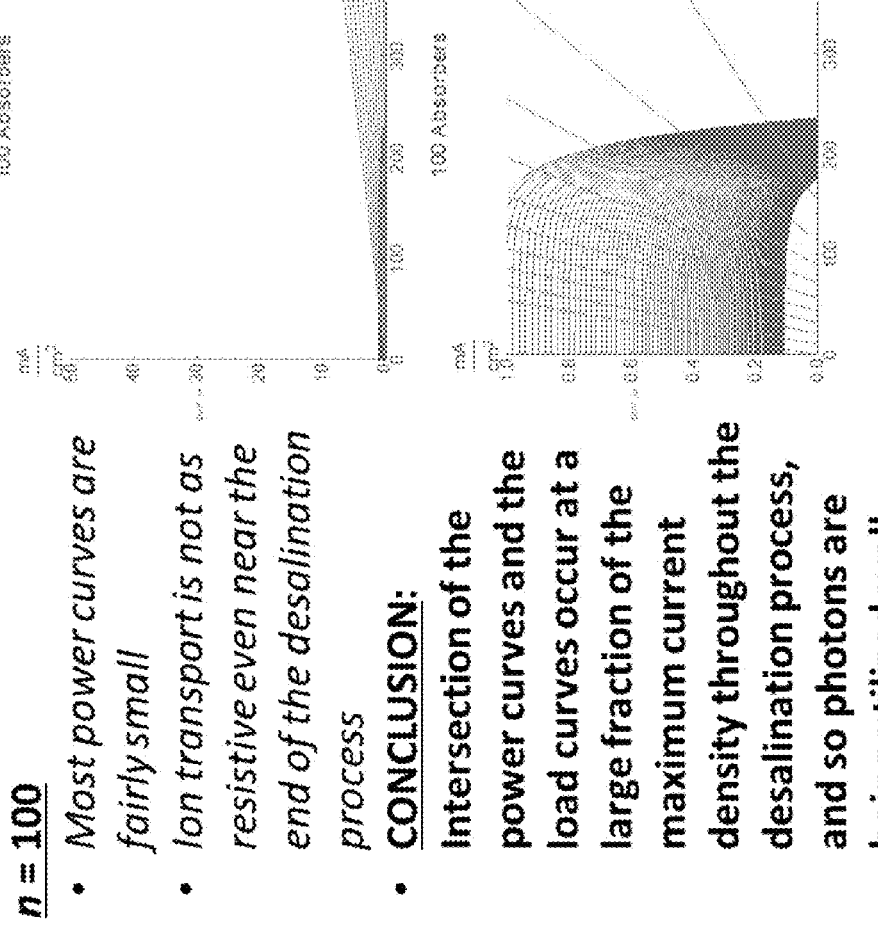

Ideal solar thermal distillation without heat recapture would require $(40.65 + 5.65\ kJ/mol) \times 55.5\ mol/L = 2{,}569.65\ kJ/L$, and with a peak solar irradiance of $0.1\ W/cm^2$ over $(60.6\ cm \times 6.02\ cm) = 0.036456\ kJ/s$, and thus the water generation rate is $70{,}486\ s/L = \underline{1{,}174.77\ minutes}$ (or 5,506.7 times slower!)

Distillation needs 99.98% heat recapture for the same rate, *which is thermodynamically impossible*

FIG. 21

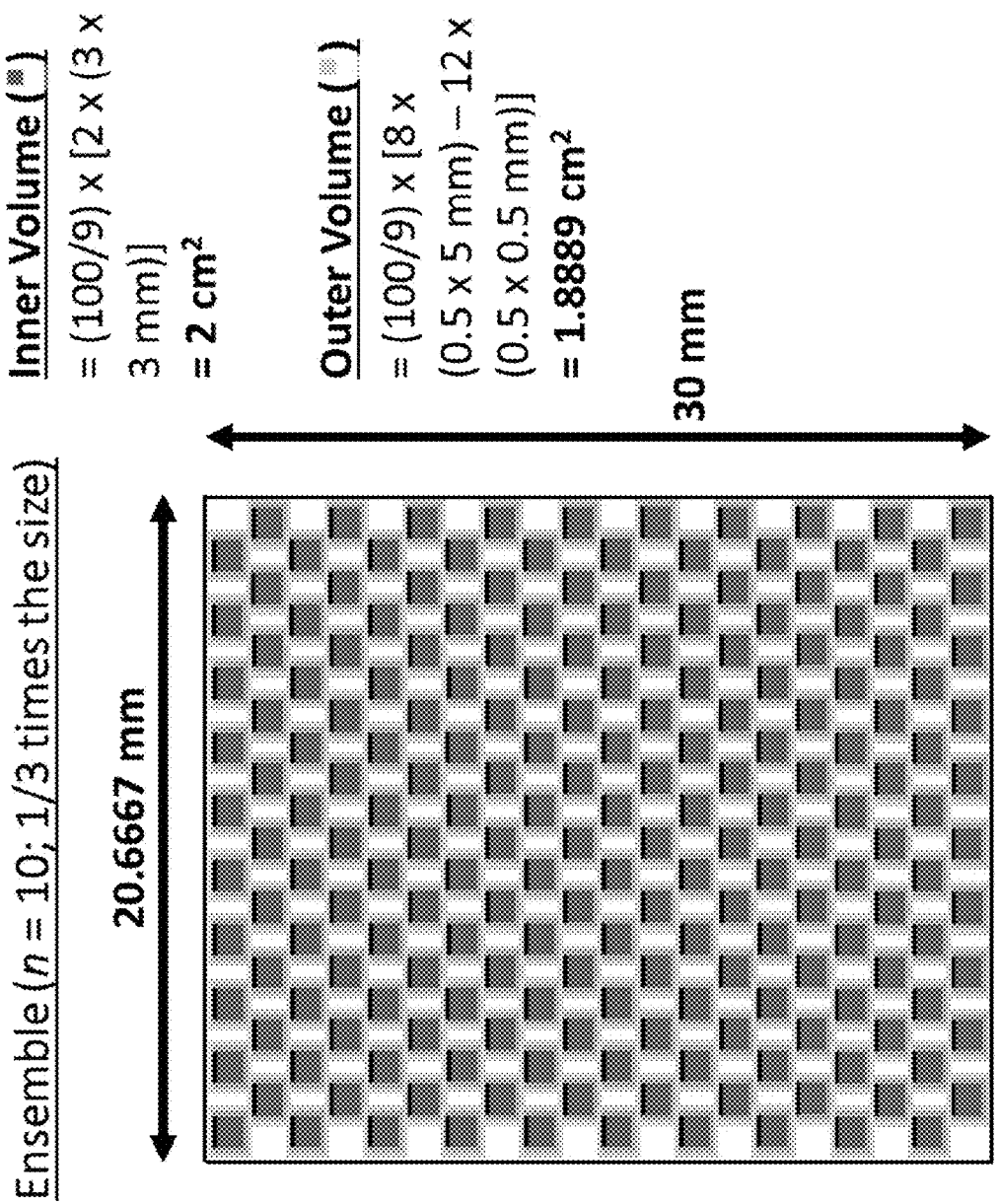

FIG. 23

Ensemble (*n* = 10; 1/3 times the size)

Inner Volume (■)
= (100/9) × [2 × (3 × 3 mm)]
= 2 cm²

Outer Volume (■)
= (100/9) × [8 × (0.5 × 5 mm) − 12 × (0.5 × 0.5 mm)]
= 1.8889 cm²

30 mm 20.6667 mm

Conditions
- Total absorption is 90% of optimal sunlight absorption (90% × 46.4 mA/cm² ≈ 41.8 mA/cm²)
- $Conc_{inner,initial}$ = 100 mM
- $Conc_{outer,initial}$ = 100 mM
- $Conc_{inner,final}$ = 190 mM
- $Conc_{outer,final}$ = 10 mM
- 1 L of water is in 3 side-by-side tubes each 1.764 meter (~5.8 ft) long with ~0.81" × 1.18" area Assumptions
- Illumination is over the full width
- $Vol_{inner} = Vol_{outer}$
- White space is not water

Power and Load Curves ($n = 10$; 1/3 times the size)

$$t_{100mM \rightarrow 10mM} = 6.06845 \text{ minutes}$$

$n = 10$ (1/3 of dimensions)
- Some power curves are fairly small
- Ion transport is not very resistive near the start of desalination process
- CONCLUSION: Intersection of power curves and load curves occur at decent fractions of maximum current density near the start of the desalination process, and so photons are being utilized well

Ideal solar thermal distillation without heat recapture would require $(40.65 + 5.65 \text{ kJ/mol}) \times 55.5 \text{ mol/L} = 2{,}569.65 \text{ kJ/L}$, and with a peak solar irradiance of $0.1 \text{ W/cm}^2$ over $(176.4 \text{ cm} \times 6.2 \text{ cm}) = 0.109368 \text{ kJ/s}$, and thus the water generation rate is $23{,}495 \text{ s/L} = \underline{391.59 \text{ minutes (or 64.5 times slower!)}}$ Distillation needs 98.45% heat recapture for the same rate

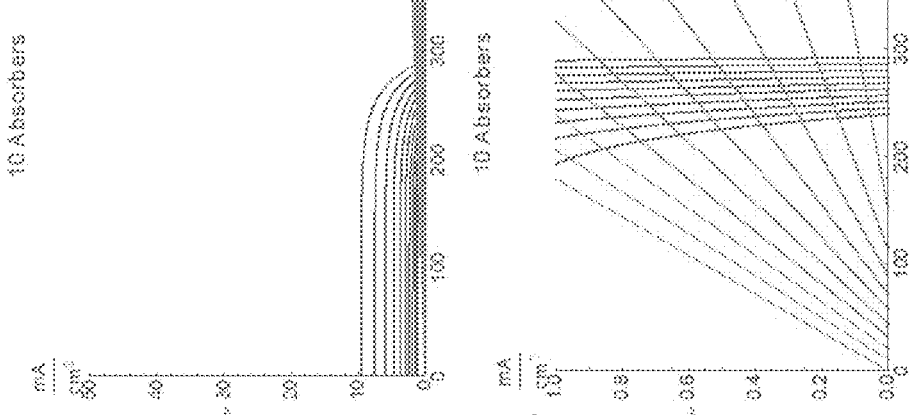

FIG. 24

OPTICALLY THIN LIGHT-ABSORBERS FOR INCREASING PHOTOCHEMICAL ENERGY-CONVERSION EFFICIENCIES

CROSS-REFERENCES TO RELATED APPLICATIONS

This application is a non-provisional and claims benefit of U.S. Provisional Application No. 62/755,410, filed Nov. 2, 2018, the specification(s) of which is/are incorporated herein in their entirety by reference.

STATEMENT REGARDING FEDERALLY SPONSORED RESEARCH OR DEVELOPMENT

This invention was made with government support under Grant No. DE-EE0006963 awarded by the Department of Energy (DOE). The government has certain rights in the invention.

BACKGROUND OF THE INVENTION

Field of the Invention

The present invention relates to photochemical energy conversion, in particular, by an ensemble of optically thin light-absorbers.

Background Art

Photochemical reactions convert and store photon energy as chemical potential via chemical transformations that are thermodynamically unfavorable. These chemical transformations can take the form of coupled chemical reactions and/or generation of concentration gradients. One of the most important guiding theories in the development of photochemical devices is the theory that dictates the energy-conversion efficiency limit as a function of model parameters. This theory has been extensively developed for and has helped guide the experimental design of high efficiency solar water splitting and solar fuels devices using semiconductors as light-absorbers.

An extraordinary range of designs, materials parameters, light harvesting scenarios, and red ox chemistries have been explored for photochemical devices, yet remarkably there is one consistent assumption in nearly all of the models: each photogenerated mobile charge carrier that reaches the surface to drive a pair chemical redox reactions does so from a single unit and all photogenerated mobile charge carriers of the same type that reach the surface to drive a chemical redox reaction collectively influence the same electrochemical potential to power the photochemical conversion process. This is true for not only single-absorber devices, but also tandem devices where different mobile charge carriers reach the surface of different light-absorbers that are electrically connected. In no models of these devices were there multiple independent light-absorbing units each driving the same chemical transformations at a slower rate than at a single light-absorbing unit. The term independent in this case means that the light-absorbing units are electronically decoupled from each other such that each type of photogenerated mobile charge carrier that reaches the surface to drive a chemical transformation does not contribute to the same electrochemical potential. This can occur when each light-absorbing unit has the same or similar materials properties and in which case often leads to each unit absorbing light at a different rate and thus driving chemical transformations at a different rate.

It is not surprising that models of artificial photosynthetic constructs only incorporate one monolithic light-absorbing unit to drive desired energy conversion and storage redox chemistry, because nearly all demonstrations of semiconductor solar fuels devices use monolithic constructs. However, there is a unique class of solar energy conversion designs that instead use ensembles of molecules or semiconductor photocatalyst particles that are not in direct electronic contact with each other to each perform the same redox chemistry. The lack of an electronic connection means that each unit individually performs photochemical redox reactions and that the total net rate of product formation from the ensemble determines the overall energy conversion efficiency. This arrangement of multiple independent light-absorbers is pertinent to natural photosynthesis in green plants, where each pair of photosystems only absorbs a small amount of incident sunlight and independently drives two half-reactions, but the net effect of the collection of all dual-photosystems is to generate substantial amounts of reaction products. The most successful experimental demonstrations of artificial photosynthesis where each unit weakly absorbs incident sunlight was reported using photocatalyst sheets to perform water electrolysis. In these devices, the size of the photocatalyst particles is small enough that they transmit significant amounts of light and the particles are weakly coupled so that particle-to-particle electron-transfer is inefficient and they can be considered to be electronically decoupled.

Reports of models that evaluate artificial photosynthetic constructs based on photocatalytic particles are uncommon. Most recently, a device-level transport model was developed for a Z-scheme photocatalyst particle suspension reactor mediated by a redox shuttle that included optical absorption, semiconductor charge separation, and chemical species transport. This continuum model captured the phenomena of variable quasi-Fermi-level splitting and differing rates of electrocatalysis and diffusive charge transport at different light intensities, because incident light was attenuated deeper into the device by a BeerLambert law absorption profile. However, inclusion of chemical species transport in that model resulted in reactor-level energy conversion efficiencies that were dominated by these physical processes.

In the invention presented herein, benefits of using multiple light-absorbing units were realized for two different photochemical systems: sunlight-driven water electrolysis and sunlight-driven ion-pumping desalination. For sunlight-driven water electrolysis, and generally for any type of light driving any pair of redox reactions, use of an ensemble of independent light-absorbing units means that each light-absorbing unit absorbs only a portion of the above-bandgap incident light and therefore each performs the pair of redox reactions at a slower rate than possible from a single light-absorbing unit, but surprisingly it was found that the collective overall energy conversion efficiency, and therefore the collective rate of product formation, was substantially larger from the ensemble of independent light-absorbing units than from a single light-absorbing unit for materials with desirable bandgaps. Uniquely and additionally beneficial for sunlight-driven ion-pumping desalination to generate a concentration gradient of dissolved salt species, as the size of the light-absorbing unit decreases the energy required to drive the chemical transformations for desalination at a fast rate also decreases because it is dominated by ohmic current-voltage behavior that becomes less energy-intensive as the path of ion transport decreases. Several physical processes underlie these behaviors including optical thinning of the light-absorbing units, reabsorption of photons emitted from other light-absorbing units due to radiative recombination, and better load matching between the power output from each light-absorbing unit and the electrochemical load due to changes in the current-voltage behavior of each light-absorbing unit, and for some cases of desalination, also due to changes in the current-voltage behavior of the electrochemical load.

BRIEF SUMMARY OF THE INVENTION

It is an objective of the present invention to provide systems and methods that are more energy efficient in using light to drive thermodynamically unfavorable chemical transformations, as specified in the independent claims. Embodiments of the invention are given in the dependent claims. Embodiments of the present invention can be freely combined with each other if they are not mutually exclusive.

The present invention features a system of optically thin light-absorbing; units that independently drive thermodynamically unfavorable chemical transformations, such as water electrolysis, $CO_2$ reduction, $N_2$ reduction, desalination, among others. The light-absorbing units can be comprised of materials with the same bandgaps, but that is not a necessary condition. Said ensemble of light-absorbing units was found to be more energy efficient, meaning that the total collective net rate of driving the chemical transformations was faster, than for other technologies that use light to drive the same chemical transformations at a single light-absorbing unit. In some embodiments, the bandgap energy falls in a near-optimal bandgap range in order to obtain the beneficial effect in efficiency. For instance, the bandgap energy may be about 0.25-0.50 eV larger than the energy required to drive the chemical transformations, which includes desalination, and up to approximately 2 eV larger when more energy-demanding redox reactions like water electrolysis are driven.

In some embodiments, the light-absorbing units are sized to be thinner than an equivalent single light-absorbing unit, but not too thin to not result in a net increase in the efficiency/rate/amount of product formation. In preferred embodiments, each light-absorbing unit in an ensemble absorbs enough light so that the sum of the changes in the electrochemical potential of the two mobile charge carriers, e.g. electrons and "electron holes" in electronic semiconductors or protons and "proton holes" in protonic semiconductors, is larger than the free energy required to drive the thermodynamically unfavorable chemical transformations. Characteristics required to meet this are highly dependent on the optical properties of the light-absorbing units, the quality of the semiconducting regions of the light-absorbing units, the effectiveness of the catalysts at the surface of the light-absorbing units, and the resistance of the phases where charges transport. For very high-quality semiconductor light-absorbers with bandgaps that result in non-negligible rates for desired chemical transformations from a single light-absorbing unit, low-resistance charge transport media, and catalysts capable of driving redox reactions at rates consistent with state-of-the-art electrocatalysts for water electrolysis, at a minimum the top light-absorber should absorb approximately 0.0001% of incident sunlight and in which case assuming absorption coefficients like that of crystalline silicon each light-absorbing unit may be approximately 1 nm thick.

One of the unique and inventive technical features of the present invention is the ensemble of stacked individual light-absorbing units that are not connected electrically. Thus they operate in parallel and only affect each other by absorbing light that would otherwise be incident on other light-absorbing units located underneath and by changing the concentration of chemical reactants or products that effect the amount of free energy required from each light-absorbing unit to drive the thermodynamically unfavorable chemical transformations. Without wishing to limit the invention to any theory or mechanism, it is believed that by increasing the number of absorbers, the observed total net rate for driving the chemical transformations increased and continued to increase with larger number of light-absorbing units as long as the majority of the light-absorbing units photogenerated sufficient electrochemical potential to drive the thermodynamically unfavorable chemical transformations. None of the presently known prior references or work has the unique inventive technical feature of the present invention.

Furthermore, the prior references teach away from the present invention. For example, in the solar cell field, previous works have taken light absorbers and stacked them into electrically connected tandem designs so that by using two materials that absorb in specifically different regions of the solar spectrum, the efficiency can be enhanced, mostly due to an increase in photovoltage, versus just using any single light absorber. This efficiency increase occurs because the materials do not compete for many of the photons as only one material can absorb the low-energy photons and both materials have to have the same rate of photon absorption for maximum efficiency. Other works involved stacking two identical materials and connecting them electrically in series, with the top material being thinner and thus transmitting significant amounts of light to the bottom material. However, this did not change the solar cell efficiency versus using a single thick light absorber because power output is the important parameter for a solar cell and this arrangement halved the current and doubled the voltage so that the power did not change. However, this tandem design is useful for driving some specific electrochemical reactions because unlike solar cells, electrochemical cells require a minimum voltage to drive the thermodynamically unfavorable redox reactions. In some cases, the single thick light absorber generated inadequate photovoltage to drive thermodynamically unfavorable redox reactions, but by using an electrical series connected tandem design, the photovoltage doubled and then driving the thermodynamically unfavorable redox reactions was possible. This tandem design can be extended to many more light absorbers consisting of the same material, but no matter what, the solar cell efficiency does not increase, and the efficiency to drive thermodynamically unfavorable redox reactions ultimately starts to decrease. This is because once a sufficient photovoltage is generated to drive the thermodynamically unfavorable redox reactions, using more light absorbers consisting of the same material decreases the net photocurrent because all materials are electrically connected in series and the smallest current limits the overall device current, which dictates the rate and thus efficiency of driving the net redox reactions. For most redox reactions of commercial and technological relevance and effective solar cell materials, 1-4 light absorbers are used. Thus, the previous works teach that stacking light absorbers having the same material and connecting them electrically in series is almost always useless for solar cells, yet may help photoelectrochemical designs to generate the photovoltage required to drive thermodynamically unfavorable redox reactions, but beyond that, there was no benefit to having more light absorbers and it instead decreased overall efficiency.

In the case where a single light absorber could generate a large enough photovoltage to drive the thermodynamically unfavorable electrochemical redox reactions on its own, there is generally no benefit to using more than one light absorber, and maximally, two stacked light absorbers connected electrically in series are best in the case where the operating current from the single light absorber is low. However, nothing in the prior art discloses stacking light-absorbing units but allowing each to independently drive the electrochemical redox reactions and thus operate in parallel. Again, doing this for a solar cell would not increase the efficiency at all, except a very small amount of <1% in efficiency for the case where photon recycling occurs, and conventional teachings would say to not go through the trouble of making, stacking, and electrically connecting in series two or more light absorbers because it provides no benefit but added complexity. For photoelectrochemical designs, if enough light absorbers are stacked and connected electrically in series so that the photovoltage is sufficient to drive the redox reactions, then it is counterintuitive to stack more because the current is being traded for voltage and current limits performance so losing current decreases performance. Moreover, while the benefit to stacking light absorbers and connecting them electrically in series allowed for larger photovoltages to drive high energy electrochemical reactions, connecting them in parallel would seem ineffective because that would not increase the photovoltage at all. Therefore, the prior arts teach that increased complexity has no benefit in solar cell efficiency and in photovoltage in photoelectrochemical designs. However, the present invention surprisingly discovered having stacked light-absorbing units operate electrically in parallel actually increases efficiency, and in some cases substantially by at least an order-of-magnitude.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 1 shows a non-limiting embodiment of a device design comprising a serial ensemble of optically coupled light-absorbers each of thickness r and each driving overall water electrolysis in an acidic aqueous solution. This model geometry was used to attain the simulation results and similar trends as a function of the number of light absorbers would arise if the planar light absorbers are replaced with an array of spherical light absorbers or other standard geometries of varying sizes.

FIGS. 2A-2B show schematics of absorption conditions for conceptual models with uniform photon absorption for N light-absorbers and that do not include effects due to photon recycling: small A/large Φ model (FIG. 2A) and large A/small Φ model (FIG. 2B).

FIGS. 3A-3F show the standard full physics model (coupled model) versus the same model that does not include effects due to photon recycling (standard decoupled model). Results from the coupled model for solar-to-fuel (STF) efficiency (FIG. 3A) and difference in STF efficiency from N=1 case (FIG. 3B), each as a function of bandgap energy for varied number of light-absorbers, N. Results from the standard decoupled model in the absence of photon recycling for STF efficiency (FIG. 3C), difference in STF efficiency from the N=1 case (FIG. 3D), and difference in STF efficiency in the presence (panel a) minus absence (panel c) of photon recycling (FIG. 3E), each as a function of bandgap energy for varied N. FIG. 3F shows load curve and power curves for the standard decoupled model showing the N=1 case (black line) and the N=8 case (red lines) where overall STF efficiency is improved. The open-circuit photovoltage is labeled $V_{oc,N=1}$ for the top light-absorber in both cases and the short-circuit photocurrent density is labeled $j_{G_{solar},N=1}$ for the single-absorber case.

FIGS. 4A-4C shows power conversion efficiency as a function of bandgap energy for varied number of light-absorbers, N, assuming a photovoltaic device for the coupled model (FIG. 4A) and the standard decoupled model (FIG. 4B), where each operating current and voltage is selected at the point that maximizes power. FIG. 4C shows maximum power conversion efficiency (PCE) as a function of N, on a base 2 logarithmic scale, for each case.

FIGS. 5A-5B show internal quantum yield per absorber. Maps of internal quantum yield ($\phi_{int,n}$) as a function of light-absorber number and bandgap energy with N=128 are shown for the coupled model (FIG. 5A) and the standard decoupled model (FIG. 5B). Green lines indicate the division between light-absorbers that have a larger value of $\phi_{int,n}$ (right and above) and a smaller value of $\phi_{int,n}$ (left and below) in comparison to the value of $\phi_{int,N=1}$ for the single-absorber case.

FIGS. 6A-6F show internal quantum yield per absorber with rapid electrocatalysis. Maps of internal quantum yield ($\phi_{int,n}$) as a function of light-absorber number and bandgap energy with N=128 are shown for the coupled model (FIGS. 6A, 6C, 6E) and the standard decoupled model (FIGS. 6B, 6D, 6F), with exchange current densities for both reactions set equal to (a, b) 0.1 mA/cm$^2$, (c, d) 1.0 mA/cm$^2$, and (e, f) 10 mA/cm$^2$. Green lines indicate the division between light-absorbers that have a larger value of $\phi_{int,n}$ (right and above) and a smaller value of $\phi_{int,n}$ (left and below) in comparison to the value of $\phi_{int,N=1}$ for the single-absorber case.

FIGS. 7A-7C show decoupled models with uniform photon absorption. Solar-to-fuel (STF) efficiency as a function of bandgap energy for varied number of light-absorbers, N, for the small A/large Φ decoupled model (FIG. 7A) and the large A/small Φ decoupled model (FIG. 7B). FIG. 7C shows maximum STF efficiency as a function of N, on a base 2 logarithmic scale, for each of the four models examined.

FIGS. 8A-8B show the effects due to electrocatalytic parameters in the decoupled model. Maximum solar-to-fuel (STF) efficiency as a function of the number of light-absorbers, N, on a base 2 logarithmic scale, for the coupled model with varied electrocatalytic parameters for both exchange current densities (FIG. 8A) and both charge-transfer coefficients (FIG. 8B).

FIGS. 9A-9O shows rapid electrocatalysis over several exchange current densities. Solar-to-fuel (STF) efficiency as a function of bandgap energy for varied number of light-absorbers, N, are shown for the coupled model (FIGS. 9A-9C), the standard decoupled model (FIGS. 9D-9F), the small A/large Φ decoupled model (FIGS. 9G-9I), and the large A/small Φ decoupled model (FIGS. 9J-9L), with exchange current densities for both reactions set equal to 1 mA/cm$^2$ (FIGS. 9A, 9D, 9G, 9J), 10 mA/cm$^2$ (FIGS. 9B, 9E, 9H, 9K), and 100 mA/cm$^2$ (FIGS. 9C, 9F, 9I, 9L). Maximum STF efficiency as a function of N, on a base 2 logarithmic scale, is shown for each model with exchange current density of 1 mA/cm$^2$ (FIG. 9M), 10 mA/cm$^2$ (FIG. 9N), and 100 mA/cm$^2$ (FIG. 9O).

FIGS. 10A-10O show rapid electrocatalysis over several charge-transfer coefficients. Solar-to-fuel (STF) efficiency as a function of bandgap energy for varied number of light-absorbers, N, is shown for the coupled model (FIGS. 10A-10C), the standard decoupled model (FIGS. 10D-10F), the small A/large Φ decoupled model (FIGS. 10G-10I), and the large A/small Φ decoupled model (FIGS. 10J-10L), with charge transfer coefficient for all reactions set equal to 1.5 (FIGS. 10A, 10D, 10G, 10J), 1.0 (FIGS. 10B, 10E, 10H, 10K), and 0.5 (FIGS. 10C, 10F, 10I, 10L). Maximum STF efficiency as a function of N, on a base 2 logarithmic scale, is shown for each model with charge transfer coefficients set equal to 1.5 (FIG. 10M), 1.0 (FIG. 10N), and 0.5 (FIG. 10O). Y-axis ranges differ for the data in FIGS. 10M-10O.

FIGS. 11A-11U show the effects due to non-radiative recombination in the coupled model. Solar-to-fuel (STF) efficiency as a function of bandgap energy for varied number of light-absorbers, N, is shown for the coupled model with non-radiative recombination due to bulk shallow traps (FIGS. 11A-11C), bulk midgap traps (FIGS. 11D-11F), surface shallow traps (FIGS. 11G-11I), surface midgap traps (FIGS. 11J-11L), surface shallow traps and charge transfer coefficient for all reactions set equal to 0.5 (FIGS. 11M-11O), and surface midgap traps and charge transfer coefficient for all reactions set equal to 0.5 (FIGS. 11P-11R), with quantum yield for emission ($\phi_{em}$) set equal to $10^{-1}$ (FIGS. 11A, 11D, 11G, 11J, 11M, 11P), $10^{-2}$ (FIGS. 11B, 11E, 11H, 11K, 11N, 11Q), and $10^{-6}$ (FIGS. 11C, 11F, 11I, 11L, 11O, 11R). Maximum STF efficiency as a function of N, on a base 2 logarithmic scale, is shown for each model with $\phi_{em}$ set equal to $10^{-1}$ (FIG. 11S), $10^{-2}$ (FIG. 11T), and $10^{-6}$ (FIG. 11U). X-axis ranges differ for the data in FIGS. 11M-11R in comparison to the data in FIGS. 11A-11L.

FIG. 12 is a cross-section of one half of a unit cell of a non-limiting embodiment of a device design for sunlight-driven desalination incorporating a light-driven ion pump as an absorber (top black line) in a square-cross-sectional tube (green lines) with water inside (dark blue) and outside (light tube) of the tube and where upon illumination, the outer chamber becomes desalinated and the inner chamber becomes concentrated in ions. This model geometry was used to attain the simulation results and similar trends as a function of the number of light absorbers would arise if the absolute and relative dimensions differed.

FIG. 13 is a non-limiting embodiment of an ensemble of 20 thick (n=10) staggered light absorbers from FIG. 12 and includes the assumptions and conditions for the model and simulation, including that the open-circuit photovoltage is ~360 mV for the single light absorber, which is a reasonable maximum, and that it decreases by ~60 mV per order of magnitude decrease in light absorbed which is consist with a model where surface recombination limits performance.

FIG. 14 is a non-limiting embodiment of an ensemble of 2 thick (n=1) staggered light absorbers from FIG. 12 and includes the assumptions and conditions for the model and simulation, including that the open-circuit photovoltage is ~360 mV for the single light absorber, which is a reasonable maximum, and that it decreases by ~60 mV per order of magnitude decrease in light absorbed which is consist with a model where surface recombination limits performance.

FIG. 15 shows power curves for an ensemble of light absorbers shown in FIG. 14 with n=1 and the load curves over time as the originally 100 mM salt water is desalinated into 10 mM salt water.

FIG. 17 shows power curves for an ensemble of light absorbers with n=5 and the load curves over time as the originally 100 mM salt water is desalinated into 10 mM salt water.

FIG. 18 shows power curves for an ensemble of light absorbers shown in FIG. 13 with n=10 and the load curves over time as the originally 100 mM salt water is desalinated into 10 mM salt water.

FIG. 19 shows power curves for an ensemble of light absorbers with n=20 and the load curves over time as the originally 100 mM salt water is desalinated into 10 mM salt water.

FIG. 20 shows power curves for an ensemble of light absorbers with n=50 and the load curves over time as the originally 100 mM salt water is desalinated into 10 mM salt water.

FIG. 21 shows power curves for an ensemble of light absorbers with n=100 and the load curves over time as the originally 100 mM salt water is desalinated into 10 mM salt water.

Figure 22A:
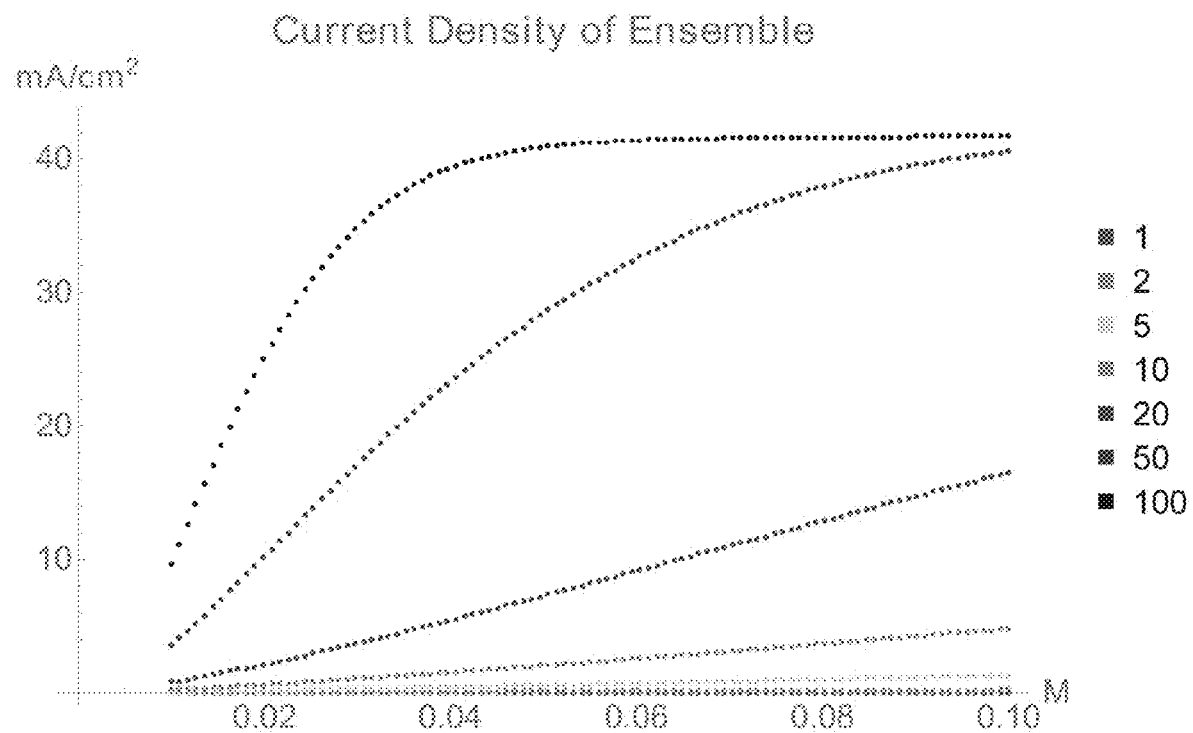
Figure 22B:
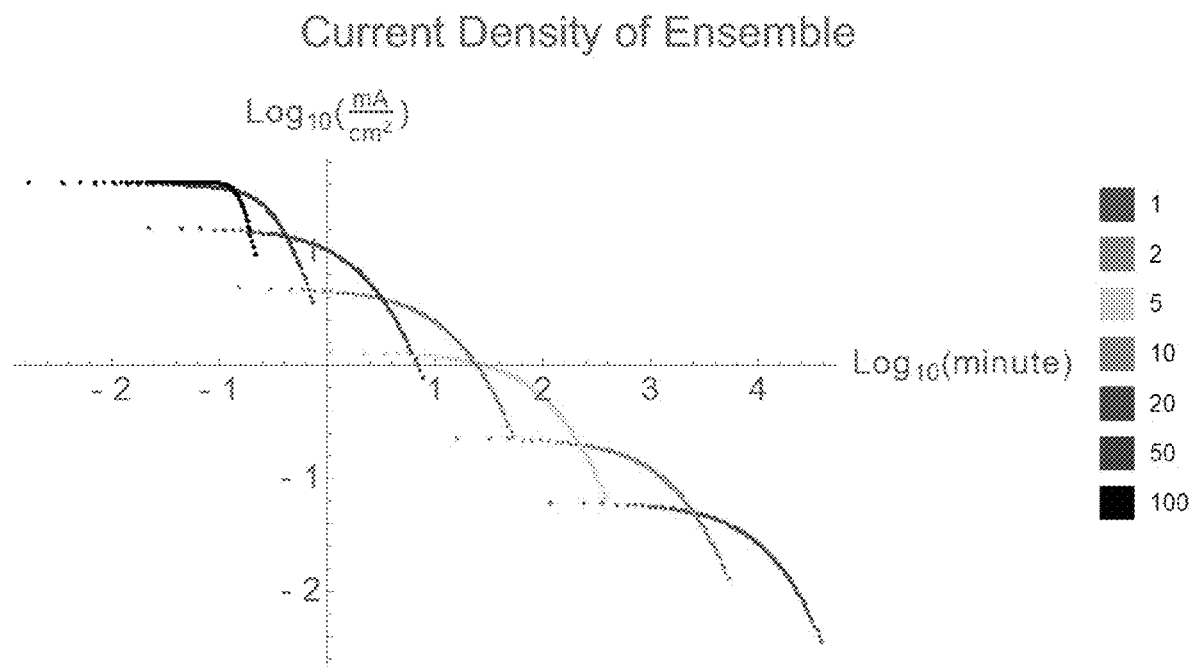
Figure 22C:
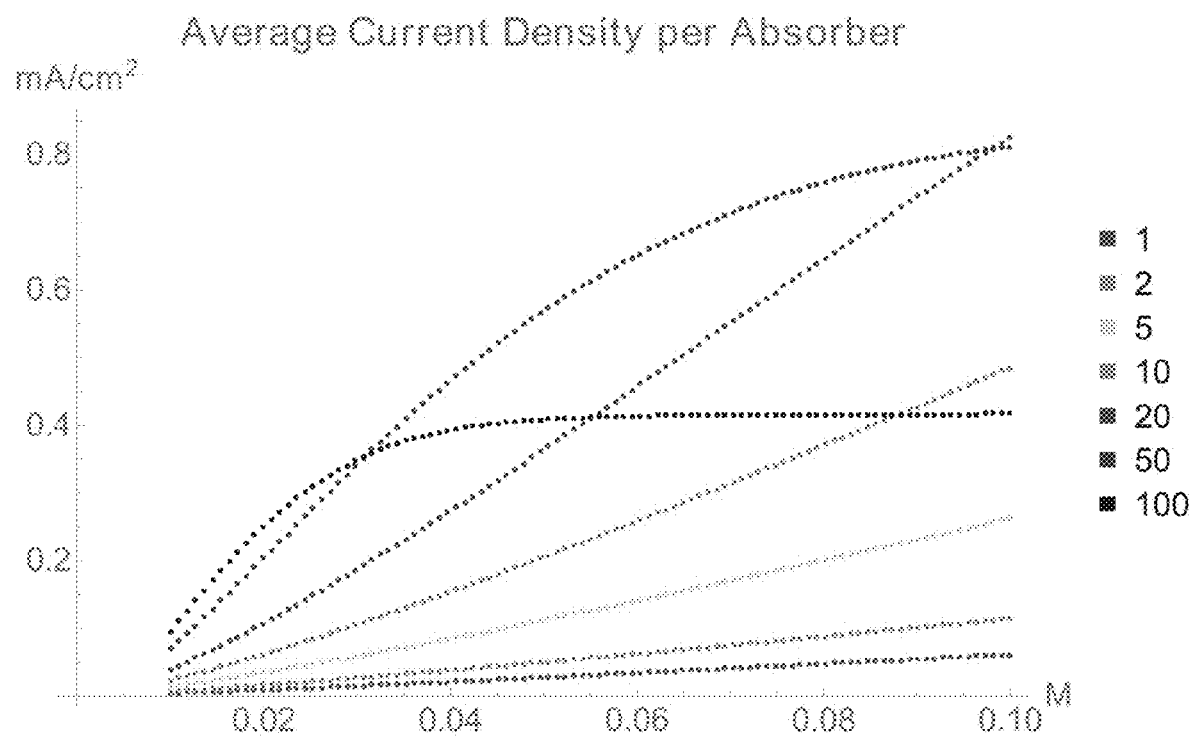
Figure 22D:
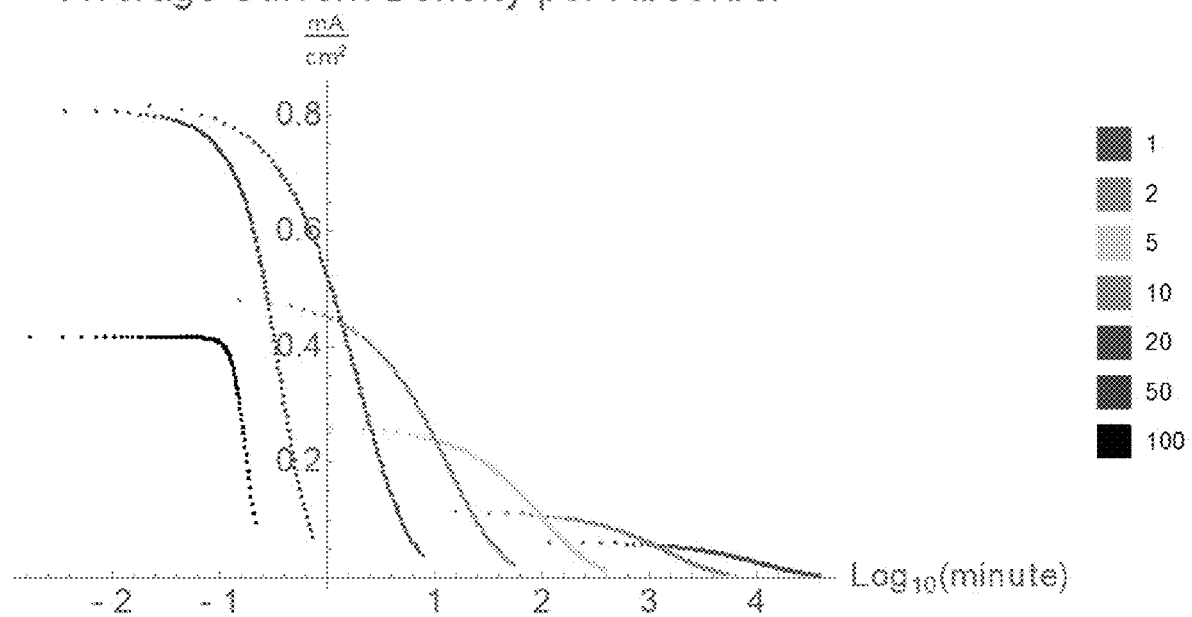

FIGS. 22A-22D are comparisons of net current density over time during desalination from an ensemble with the indicated value of n, for the total current density as a function of salt concentration that is formed over time (FIG. 22A), for the total current density as a function of time (FIG. 22B), average current density per light absorber as a function of salt concentration that is formed over time (FIG. 22C), and for the average current density per light absorber as a function of time (FIG. 22D).

Figure 12:
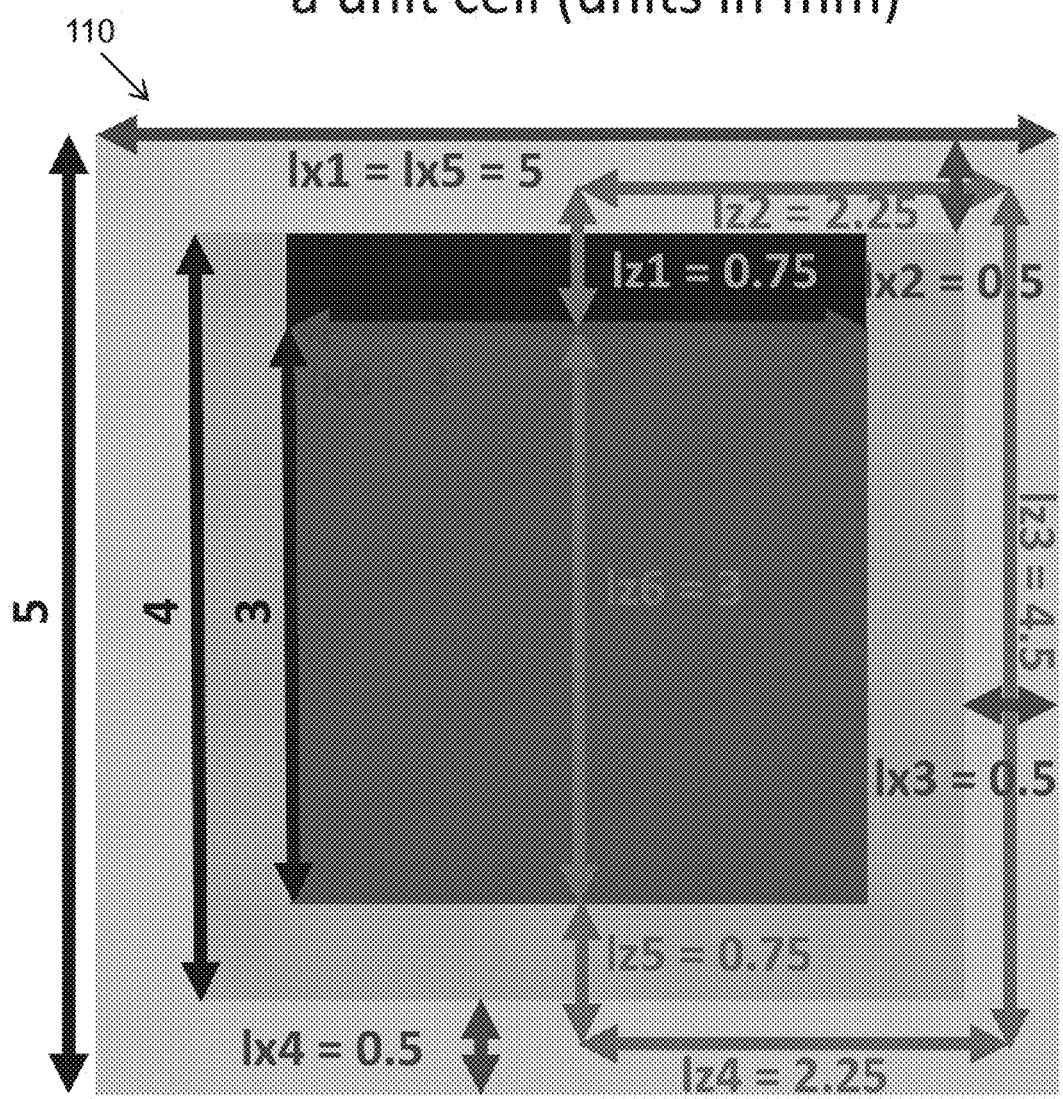

FIG. 23 is a non-limiting embodiment of an ensemble of 20 thick (n=10) staggered light absorbers from FIG. 12, but at ⅓ times the size, and includes the assumptions and conditions for the model and simulation, including that the open-circuit photovoltage is 360 mV for the single light absorber, which is a reasonable maximum, and that it decreases by 60 mV per order of magnitude decrease in light absorbed which is consist with a model where surface recombination limits performance.

FIG. 24 shows power curves for an ensemble of light absorbers shown in FIG. 23 with n=10 and the load curves over time as the originally 100 mM salt water is desalinated into 10 mM salt water.

Figure 25:
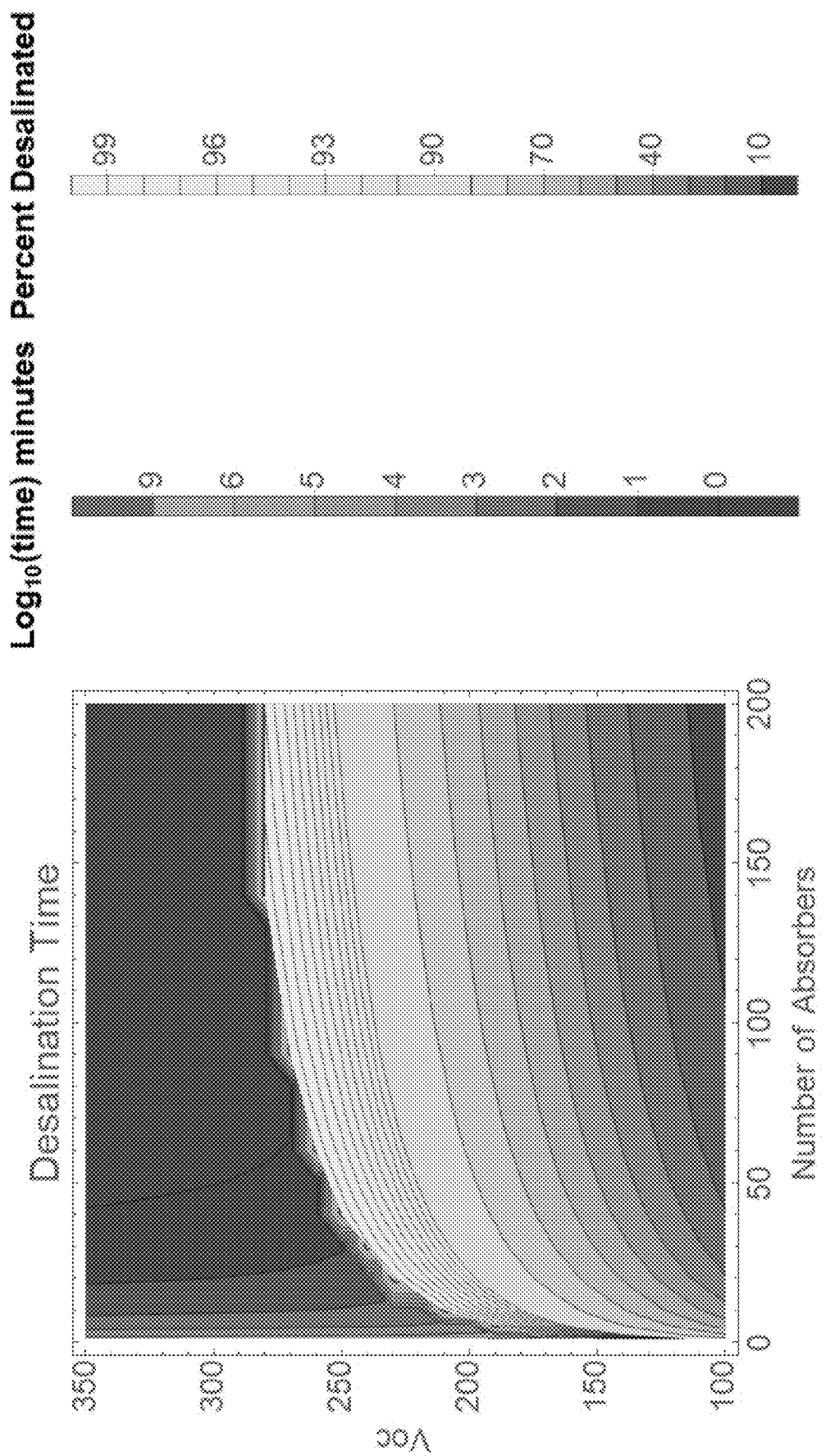

FIG. 25 shows how the open-circuit photovoltage, plotted as the open-circuit photovoltage of the single absorber when it absorbs 90% of incident above-bandgap sunlight, influences the amount of time it takes to desalinate the water as a function of the number of absorber unit cells in the thickness of the design, n. For conditions where full desalination to 10 mM salt water outside and 190 mM salt water inside could not be attained due to lack of required photovoltage, instead the final percentage attained of this desired concentration gradient is shown.

DETAILED DESCRIPTION OF THE INVENTION

Referring now to FIGS. 1-25, in some embodiments, the present invention features a light-driven system (100) for a desalination process. The system (100) may comprise a plurality of light-absorbing units (110) arranged in a stacked array. In some embodiments, each light-absorbing unit (110) operates independently and in parallel to net drive a thermodynamically unfavorable chemical transformation of desalination, thereby increasing an overall efficiency, rate, or amount of desalinated water formed as compared to a single light-absorbing unit having a same amount of light-absorbing ability or material as the plurality of light-absorbing units (110). In one embodiment, the efficiency, rate, or amount of desalinated water is increased by about 10% to 100%. In another embodiment, the efficiency, rate, or amount of desalinated water is increased by a factor of about 1 to 10,000,000.

In some embodiments, the light absorbers that drive desalination may be constructed from inexpensive materials with low processing costs. Non-limiting examples thereof include ion-selective polymers functionalized with photoacids or photobases and incorporated into light-driven ion pumping tubes. In some embodiments, the light-absorbing units (110) may have near-optimal bandgaps. The near-optimal bandgap may be about 0.5 eV larger than a free energy required to drive desalination and less than about 1.5 eV. In one embodiment, a single light-absorbing unit (110) may generate a photovoltage of about 0.05-0.40 V when it absorbs nearly all incident above-bandgap sunlight.

In one embodiment, the number, N, of light-absorbing units (110) may range from 5-1,000. For example, the number of light-absorbing units (110) may range from 5-100. In one example, loss in performance may be noticeable at about 100-500 light absorbers for a desalination process that use light-absorbing units that generate a photovoltage of 250-300 mV when they absorb nearly all incident above-bandgap sunlight.

In some embodiments, each light-absorbing unit (110) may be 1/N as thick as the single light-absorbing unit that can absorb nearly all incident above-bandgap sunlight. In some embodiments, a single light-absorbing unit (110) absorbs at least about 90% incident above-bandgap sunlight. In other embodiments, a single light-absorbing unit (110) absorbs at least about 95% incident above-bandgap sunlight. In some other embodiments, a single light-absorbing unit (110) absorbs at least about 98% incident above-bandgap sunlight.

According to some embodiments, the present invention features a light-driven system (100) for water electrolysis or other pairs of electrochemical redox reactions. The system (100) may comprise a plurality of light-absorbing units (110) arranged in a stacked array. Each light-absorbing unit (110) can operate independently and in parallel to net drive a thermodynamically unfavorable chemical transformation of water electrolysis, thereby increasing a solar-to-fuel efficiency as compared to a single light-absorbing unit having a same amount of light-absorbing ability or material as the plurality of light-absorbing units (110). In one embodiment, the efficiency is increased by about 10% to 50%. In another embodiment, the efficiency is increased by a factor of about 0.5 to 30.

In some embodiments, the light-absorbing units (110) may have near-optimal bandgaps. For example, the near-optimal bandgap may be about 0.25 eV larger than a free energy required to drive the redox reactions and less than about 2.0 eV In other embodiments, the light-absorbing units (110) are comprised of a material having a 1.6-2.0 eV bandgap to drive water electrolysis.

In some embodiments, the system (100) may comprise N number of light-absorbing units (110). In referred embodiments, each light-absorbing unit (110) may be 1/N as thick as the single light-absorbing unit that can absorb nearly all incident above-bandgap sunlight.

In other embodiments, the number of light absorbers, N, may range from about 5 to about 1,000. In some other embodiments, the number of light absorbers may be greater than 1,000. For example, for water electrolysis, the number of light absorbers may be in the 1000s without noticeable effects on performance.

In some embodiments, the light absorbers that drive photochemical redox reactions may be constructed from inexpensive materials with low processing costs. Non-limiting examples thereof include inorganic or halide perovskite materials or other related materials with or without metal, metal-oxide, or other related co-catalysts. In other embodiments, the light absorbers are cast as photocatalyst sheets or used in particle suspension reactors.

In accordance with the embodiments described herein, each light-absorbing unit (110) may absorb at least about 0.0001% of incident light. In one embodiment, each light-absorbing unit (110) may absorb at least about 0.001% of incident light or at least about 0.01% of incident light. In another embodiment, each light-absorbing unit (110) may absorb at least about 0.1% of incident light. In yet another embodiment, each light-absorbing unit (110) may absorb at least about 1% of incident light or at least about 5% of incident light.

In accordance with the embodiments described herein, each light-absorbing unit (110) may be at least about 1 nm thick. In one embodiment, each light-absorbing unit (110) may be at least about 10 nm thick. In another embodiment, each light-absorbing unit (110) may be at least about 100 nm thick. In yet another embodiment, each light-absorbing unit (110) may be at least about 1 micron thick. In other embodiments, each light-absorbing unit (110) may be at least about 10 microns thick or at least about 100 microns thick.

Example

The following is a non-limiting example of the present invention. It is to be understood that said example is not intended to limit the present invention in any way. Equivalents or substitutes are within the scope of the present invention.

Methods

The following is a general model that can accurately predict the efficiency limits of an ensemble of light absorbers that convert sunlight into chemical energy via redox chemistry. There are no specific choices about materials properties or device geometries in order to keep the model general. As a result, each light-absorber in an ensemble is identical, has index of refraction of one, and is perfectly planar and extends infinitely in that plane. The terms in the detailed-balance analysis that arise from specific geometries and material refractive indices appear as coefficients in the photodiode equation and are independent of other model parameters. Instead of modeling a three-dimensional grid of light-absorbers, it suffices to model the light-absorbers as infinite sheets because in a three-dimensional model, symmetry causes there to be no net radiative coupling in the planar directions, under the reasonable assumption of either perfectly reflective container walls or a sufficiently large container with negligible edge-effects. A three-dimensional grid of cubic light-absorbers thus would give the exact same result as the infinite sheets considered in this model. A single light-absorber bandgap is considered in order to focus specifically on the effects of a multiple-absorber configuration. Again, the results herein are applicable to multiple-absorber configurations that are either electrically or electrochemically connected. Electrocatalytic parameters relevant to water electrolysis are used herein, although the model can be applied to any set of electrochemical reactions. Lastly, because data for most efficient demonstrations of solar fuels production are reported in terms of potential (V) and current density (j), and not (electro)chemical potential (μ) and species flux (Φ), when possible the derivations and analyses use the more widely recognized solar fuels terminology and nomenclature.

Full Detailed Balance Model of N Absorbers

Figure 1:
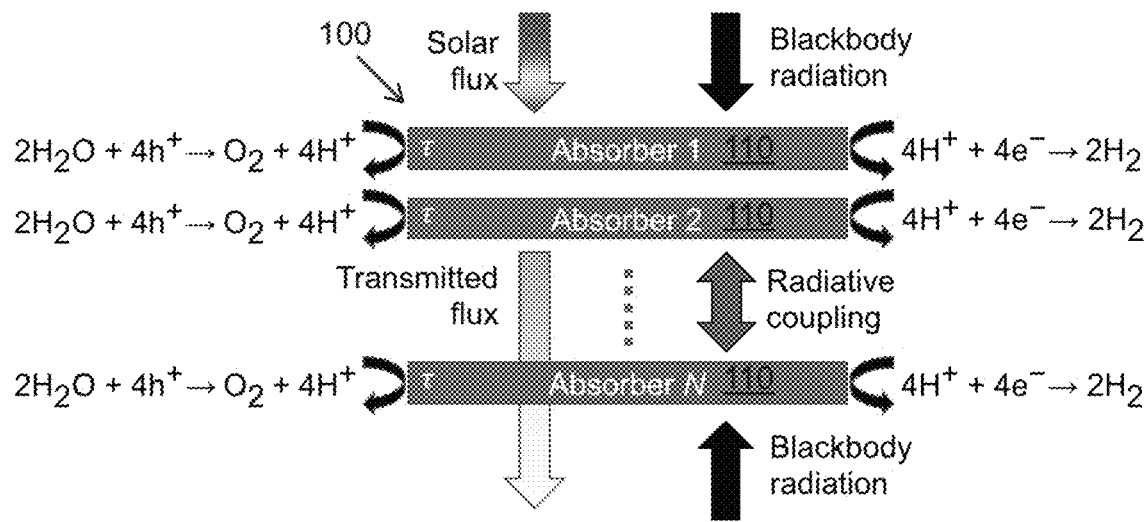
Figure 2A:
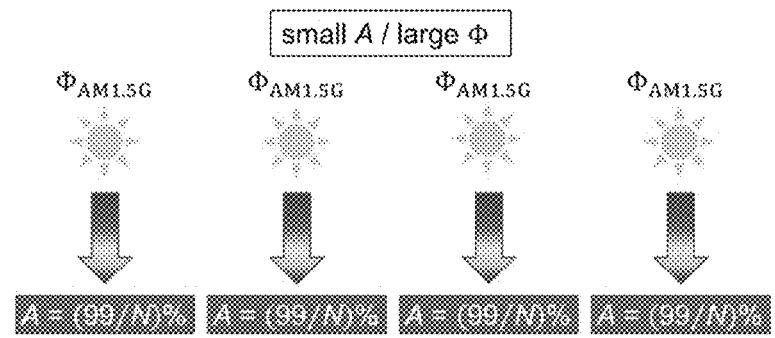
Figure 2B:
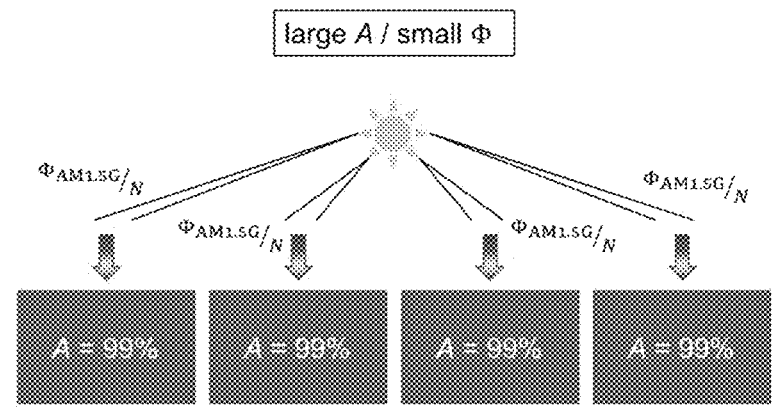

FIG. 1 shows a schematic of the model, which consists of a one-dimensional array of N planar light-absorbers each with identical bandgap energy, $E_g$, and optical thickness, $\tau$. The parameter $\tau$ is the dimensionless product of the absorber thickness and the absorption coefficient. Although this is generally a wavelength-dependent property, every other portion of the model treats all above-bandgap photons identically and thus the use of a single absorption coefficient for all photons above the bandgap energy has no ultimate effect on the model results while drastically simplifying the formulation. The absorptance A of above-bandgap photons is then, $$A = 1 - e^{-\tau} \quad (1)$$

The N-absorber stack is assumed to be in thermal equilibrium with its surroundings at temperature T. There is thus incident blackbody radiation on the top and bottom of the stack while each light-absorber is able to emit light via radiative recombination. This means that the absorbers are radiatively coupled to one another because some of this light can be reabsorbed by neighboring absorbers. Solar flux is incident only on the top of the stack; the convention that the first absorber is closest to the Sun while the $N^{th}$ absorber is furthest from the Sun is used.

The net flux of charge carriers that drive redox chemistry from each absorber, which when multiplied by their charge equals the current density, is a sum of the absorbed photon flux from solar and blackbody radiation and the negative flux due to radiative and non-radiative recombination. Using the subscript n to denote the $n^{th}$ absorber in the stack, we define the current density for generation of mobile charge carriers due to absorption of incident solar photons as follows, $$j_{G_{solar},n} = q\Phi_{solar}(1-A)^{n-1}(A) \quad (2)$$

where q is the elementary charge and $\Phi_{solar}$ is the total solar photon flux incident on the absorber stack. This expression is the product of the total solar flux, the fraction $(1-A)^{n-1}$ that is transmitted by the (n−1) absorbers that lie between the sun and the $n^{th}$ absorber, and the fraction A that the $n^{th}$ absorber absorbs. It is often labeled as $j_{ph}$ or $j_{sc}$, yet to more clearly delineate each (G)eneration and (R)ecombination term, the more verbose nomenclature used here.

The total above-bandgap blackbody flux incident on the entire stack, $\Phi_{bb}$, is as follows, $$\Phi_{bb} = \frac{4\pi}{c^2}\int_{E_g/h}^{\infty} v^2 e^{-hv/kT} dv \quad (3)$$

where c is the speed of light in vacuum, h is the Planck constant, v is the frequency of the radiation, k is the Boltzmann constant, and T is the ensemble and blackbody temperature. Half of this flux is incident on the top of the stack and half of this flux is incident on the bottom of the stack. An isolated light-absorber would be exposed to this flux but only absorb a fraction A.

Detailed balance dictates that the rate of photon absorption and the rate of photon emission into and out of the light-absorber must be equal when no net current is sourced elsewhere. Therefore, the potential-dependent radiative recombination rate must be equal to the total absorption rate at zero current and in general the following expressions for current density for generation due to blackbody absorption and radiative recombination hold, $$j_{G_{bb}} = q\Phi_{bb}A \quad (4a)$$

$$j_{R_{rad},n} = -j_{G_{bb},n}e^{qV_n/kT} \quad (4b)$$

where $V_n$ is the operating potential of the light-absorber. The negative current density due to radiative recombination vs. potential relationship has the form used in the Shockley photodiode equation, which is a broadly utilized Boltzmann approximation of the actual relationship for an ideal solar converter. The difference between the ideal equation and the approximate equation is negligible for all bandgaps and rates of illumination studied herein.

Each absorber in the stack absorbs light emitted by the rest of the stack, a phenomenon termed "photon recycling." Because of Equation 4b, this means that the current for each absorber depends on the potential of the other absorbers. The current density resulting from absorber n absorbing light emitted by absorber m is as follows, $$j_{G_{rad},m\to n} = -\tfrac{1}{2}j_{R_{rad},m}(1-A)^{|m-n|-1}(A) \quad (5)$$

The factor of one half is due to the fact that only half of the total radiation from absorber m propagates in the direction of absorber n. Including terms for the absorption of ambient blackbody flux, the total current density at absorber n resulting from absorption of non-solar photons takes on the following expression, $$j_{G_{nonsolar},n} = \frac{1}{2}q\Phi_{bb}A\left[(1-A)^{n-1} + (1-A)^{N-n}\right] + \sum_{m\neq n} j_{G_{rad},m\to n} \quad (6)$$

This expression satisfies the detailed-balance requirement that $j_{G_{nonsolar},n} = j_{G_{bb}}$ for all n in the dark, when there is no incident solar radiation and $V_n=0$. This is analytically proven in the Supplementary Information. The complete current density versus potential relationship describing non-radiative processes follows, $$j_{G_{nonrad}} = j_{G_{bb}}\left(\frac{1}{\phi_{em}} - 1\right) \quad (7a)$$

$$j_{R_{nonrad},n} = -j_{G_{nonrad}}e^{qV_n/kT} \quad (7b)$$

where $\phi_{em}$ is the fraction of recombination that is radiative and is therefore, the quantum yield for emission. The expression for non-radiative recombination assumes that $\phi_{em}$ is not dependent on absorbed photon flux or on potential, and that non-radiative recombination has the same potential dependence as radiative recombination. Again, this is a common assumption made in analogous analyses and is a good first approximation for most conditions. In the case of non-radiative recombination that is dominated by surface-recombination processes we set $j_{G_{nonrad}}$ equal to a constant such that it is independent of A and thus N.

The Kirchhoff current law condition requires that at steady-state the current into and out of the light-absorber is equal, which yields the following complete current density vs. potential relationship for each absorber, $$J_{rxn,n} = j_{G_{solar},n} + j_{G_{nonsolar},n} + j_{R_{rad},n} + j_{G_{nonrad},n} + j_{R_{nonrad},n} \quad (8)$$

where $j_{R_{rad},n}$ and $j_{R_{nonrad},n}$ (Equations 4b and 7b) each contain $e^{qV_n/kT}$ and therefore, the total coefficient for this exponential term in Equation 8 is $$-j_{G_{bb}}\left(\frac{1}{\phi_{em}}\right),$$

which is the reverse saturation current density in the photodiode equation. The larger the reverse saturation current density, the larger the dark current, and the smaller the open-circuit potential under illumination. The $j_{G_{nonsolar},n}$ term contains the sum of $e^{qV_m/kT}$ terms for all $m \neq n$ and thus couples all $j_{rxn,n}$ terms to each other.

The electrochemical load on each light-absorber is determined by two Butler-Volmer equations and the potential difference required to drive the two redox reactions, $E_0 = E_0^{ox} - E_0^{red}$, where the superscripts "ox" and "red" denote the (ox)idation and (red)uction reactions. Because each light-absorber performs an oxidation and a reduction reaction with equal and opposite signs of the current density in order to maintain charge neutrality, the following current density versus potential relationships hold, $$j_{rxn,n} = j_0^{ox}\left(\exp\left(\frac{\alpha_a^{ox}\eta_n^{ox}q}{kT}\right) - \exp\left(-\frac{\alpha_c^{ox}\eta_n^{ox}q}{kT}\right)\right) \quad (9)$$

$$j_{rxn,n} = -j_0^{red}\left(\exp\left(\frac{\alpha_a^{red}\eta_n^{red}q}{kT}\right) - \exp\left(-\frac{\alpha_c^{red}\eta_n^{red}q}{kT}\right)\right) \quad (10)$$

where for i=ox/red, $j_0^i$ is the exchange current density, $\alpha_a^i$ and $\alpha_c^i$ are the anodic are cathodic charge-transfer coefficients, respectively, and $\eta_n^i$ is the overpotential beyond $E_0^i$ that is required to obtain $j_{rxn,n}$. The following relationship between the operating potential, the two overpotentials, and $E_0$ is then, $$V_n = E_0 + \eta_n^{ox} - \eta_n^{red} \quad (11)$$

Equations 8-11 represent 4N coupled equations which are simultaneously solved using the vpasolve numeric solve function in MATLAB 2017b.

Metrics to Quantify the Effectiveness of Solar-to-Fuel Energy Conversion

In order to quantify the solar-to-fuel conversion efficiencies for both individual light-absorbers and light-absorber ensembles, two useful metrics were defined: the internal quantum yield and the solar-to-fuel energy conversion (STF) efficiency. The internal quantum yield is the fraction of absorbed incident solar photons that are converted into mobile charge carriers that participate in generation of net reaction products. It allows one to compare the performance of individual light-absorbers and is defined as follows, $$\phi_{int,n} = \frac{j_{rxn,n}}{j_{G_{solar},n}} \quad (12)$$

Based on the definition, $\phi_{int,n}$ can exceed unity when photon recycling is operative. The STF efficiency is the ratio between the power generated in the chemical bonds of the fuel and the incident solar power and is calculated using the following equation, $$\eta_{STF} = \frac{\sum j_{rxn,n} \times E_0}{I_{solar}} \quad (13)$$

where the sum of the individual $j_{rxn,n}$ values is multiplied by the potential stored in the fuels and divided by the total incident solar irradiance, $I_{solar}$.

Baseline Model Parameters

The baseline parameters used in the model include a temperature of 298 K, $E_0$=1.23 V, $j_0^{ox}$=3.3×10$^{-6}$ mA/cm$^2$, $j_0^{red}$=1.5×10$^{-1}$ mA/cm$^2$, $\alpha_a^{ox}=\alpha_c^{ox}$=1.97, and $\alpha_a^{red}=\alpha_c^{red}$=1.60. The electrocatalytic parameters are based on literature values at room temperature for the aqueous oxygen evolution reaction and the aqueous hydrogen evolution reaction. The dimensionless optical thickness of the entire stack is $\tau_{total}=\tau*N$. Unless otherwise noted, $\tau_{total}$ is kept as a fixed parameter while N is varied, meaning the total amount of light absorbed by the system remains constant for different values of N. Conversely, this means that as N increases, the absorptance of each individual absorber decreases. A baseline value of $\tau_{total}$=4.6 is selected, meaning that the stack absorbs 99% of all incident light. Other baseline parameters include recombination that is entirely radiative ($\phi_{em}$=1) and $\Phi_{solar}$ that follows the AM1.5G solar spectrum.

Decoupled Models

There are two major differentiating features between the ensemble-based model used herein in comparison to a traditional single-absorber model. First, even though each light-absorber absorbs the same fraction of incoming solar photon flux, there is a substantial decrease in $j_{G_{solar},n}$ values through the stack as the incident light on each light-absorber is progressively attenuated. This means that each light-absorber has a unique j-V relationship, but the same electrochemical load curve, which has drastic effects on the total amount of net fuel production from the ensemble. Second, inter-absorber photon recycling occurs when some of the radiative emission from one light-absorber is reabsorbed by the other light-absorbers in the stack. The extent of this effect is strongly influenced by the fraction of radiative recombination, $\phi_{em}$. Because many materials used as light-absorbers in solar energy conversion devices have small values of $\phi_{em}$, and therefore emit few photons, it is important to study the N-absorber design without the effects of photon recycling. Although this could be modeled in a straightforward manner by varying $\phi_{em}$, doing so drastically effects the j-V behavior of even the single-absorber case, making it difficult to specifically isolate the effect of reduced photon recycling. Therefore, a model with optically stacked absorbers but with no radiative coupling is used, termed the standard decoupled model, which still satisfies detailed balance by assuming that the nonsolar radiation incident on each light-absorber is the blackbody radiation of the thermal bath, meaning r: $j_{G_{nonsolar},n} = j_{G_{bb}}$. In the standard decoupled model, the j-V relationship for the light-absorbers calculated using Equation 8 is the standard photodiode equation, $$j_{rxn,n} = j_{G_{solar},n} + j_{G_{bb}}\left(\frac{1}{\phi_{em}}\right)(1 - e^{qV_n/kT}) \quad (14)$$

This represents the unrealistic physical situation where for absorption of solar photons, the absorbers are positioned optically in series but for absorption of all other photons, the absorbers are optically isolated yet individually surrounded by blackbodies. However, this model effectively decouples the effects of photon recycling from all other elements of the model and it is thus a useful tool for analyzing the effects of partial solar light absorption alone. The open-circuit photovoltage ($V_{oc,n}$), defined as the potential generated under an infinite-resistance electrochemical load, is a useful parameter because it quantifies the maximum potential available by each light-absorber to perform useful work. In the standard decoupled model, which has a j-V relationship dictated solely by the semiconductor photodiode equation, the expression for $V_{oc}$ is as follows, $$V_{oc,n} = \frac{kT}{q}\ln\left(\frac{j_{G_{solar},n}}{j_{G_{bb}}}\phi_{em} + 1\right) = \frac{kT}{q}\ln\left(\frac{\Phi_{solar}(1-A)^{n-1}}{\Phi_{bb}}\phi_{em} + 1\right) \quad (15)$$

and thus $V_{oc,n}$ is determined entirely by $\phi_{em}$ times the ratio of the incident above-bandgap solar flux transmitted to the $n^{th}$ light-absorber to the total incident above-bandgap blackbody flux.

Decoupled Models with Uniform Photon Absorption

Each light-absorber in the above model has the same optical thickness but a different incident solar photon flux and thus a different rate of photon absorption. The total $\eta_{STF}$ depends on the sum of all N operating current densities, and therefore, comparison of the sum to $\eta_{STF}$ for the single-absorber case at the same total number of absorbed photons will determine whether having multiple light-absorbers is beneficial or detrimental. In many cases, the effect of having multiple light-absorbers is convoluted by opposing behaviors: certain light-absorbers in the stack exhibit large values of $\phi_{int,n}$, and therefore utilize incident solar photons well, while other light-absorbers in the stack do not. Therefore, conditions that remove the chance for opposing behavior were also investigated by ensuring that each light-absorber in a multiple-light-absorber model absorbs the same number of incident solar photons. There are two distinct ways to accomplish this, depicted in FIG. 2, which each utilize N single light-absorbers, yet produce strikingly different results. In the small A/large $\Phi$ model, the incident photon flux remains at the 1 Sun intensity, $\Phi_{solar} = \Phi_{solar,AM\ 1.5G}$, but each absorber only absorbs (99/N) % of the light. Physically, this condition would be achieved by exposing N identical optically thin light-absorbers to 1 Sun illumination, which is equivalent to each light-absorber performing like the top light-absorber in the standard decoupled model. In the large A/small $\Phi$ model, each absorber is assumed to be as thick as in the single-absorber case with $\tau = 4.6$, and therefore each absorbs 99% of the incident light, but the incident photon flux to each absorber is scaled by N, such that $$\Phi_{solar} = \frac{\Phi_{solar,AM1.5G}}{N}.$$

Physically, this condition would be achieved by using optics to evenly split the solar radiation covering the area of a single absorber across N different identical absorbers that are each thick enough to each absorb 99% of the split solar photon flux. In this model, each light-absorber performs similar to a light-absorber deeper in the stack in the standard decoupled model. In each model, a total of 99% of the solar flux incident on the area of one absorber is absorbed by the N absorbers, which is exactly the same condition used in the other models, where N absorbers are stacked optically in series with $\tau_{total} = 4.6$. However, akin to the standard decoupled model, these models are not practical and instead are solely meant to serve as useful tools to identify underlying causes of changes in $\eta_{STF}$ observed from the simulations. Moreover, it is important to note that for these models $\eta_{STF}$ is still defined in terms of the solar flux incident on the area of a single light-absorber in order to compare more effectively to the results of the other models. In a small A/large $\Phi$ scenario, the true $\eta_{STF}$ would be the value reported in this work divided by N.

Proof of Radiative Detailed Balance

Consider an ensemble on N identical planar light-absorbers each with optical thickness, $\tau$, in thermal equilibrium with their surroundings through radiative coupling via their top and bottom surfaces only and no interactions from their sides. Solar radiation is incident on the ensemble on the top side of the n=1 light-absorber, and blackbody radiation is exchanged with the surroundings via the top of the n=1 light-absorber and bottom n=N light-absorber. The transmittance of each absorber, T, and the incident above-bandgap blackbody flux on both sides of the stack, $\Phi_{bb}$, is defined as follows, $$T = e^{-\tau}$$

$$\Phi_{bb} = \frac{4\pi}{c^2}\int_{E_g/h}^{\infty} v^2 \exp(-hv/kT)$$

where q is the elementary charge, c is the speed of light in vacuum, $E_g$ is the material bandgap, h is the Planck constant, k is the Boltzmann constant, and T is the ensemble and blackbody temperature.

Using the subscript n to denote the $n^{th}$ light-absorber in the ensemble, the total radiative flux emitted out both sides of a light-absorber is defined as follows, $$\Phi_{R_{rad},n} = -\Phi_{bb}(1-T)e^{qV_n/kT}$$

where $V_n$ is the potential of the $n^{th}$ light-absorber. The radiative flux emitted by absorber m and absorbed by absorber n is then $$\Phi_{G_{rad},m\rightarrow n} = \frac{1}{2}\Phi_{R_{rad},n}(T^{|m-n|-1})(1-T)$$

Summing all non-solar fluxes absorbed by a single absorber, n, gives an expression for the total absorbed flux by the $n^{th}$ absorber as follows, $$\Phi_{G_{nonsolar},n} = \frac{1}{2}\Phi_{bb}\left[T^{n-1} + T^{N-n}\right](1-T) + \sum_{m\neq n}\Phi_{G_{rad},m\rightarrow n}$$

In order to obey detailed balance, $\Phi_{G_{nonsolar},n}$ and $\Phi_{R_{rad},n}$ must be equal for all n when there is no incident solar radiation and $V_n=0$ for all n. To prove this analytically, $V_n$ is first set equal to zero to obtain a new expression for $\Phi_{R_{rad},n}$, $$\Phi_{R_{rad},n} = -\Phi_{bb}(1-T)$$

This expression is then used to evaluate $\Phi_{G_{nonsolar},n}$, $$\Phi_{G_{nonsolar},n} = \frac{1}{2}\Phi_{bb}\left[T^{n-1}(1-T) + T^{N-n}(1-T) + \sum_{m \neq n} T^{|m-n|-1}(1-T)^2\right]$$

This expression can be factored and the term in the sum expanded as follows, $$\Phi_{G_{nonsolar},n} = \frac{1}{2}\Phi_{bb}(1-T)\left[T^{n-1} + T^{N-n} + \sum_{m \neq n}\left(T^{|m-n|-1} - T^{|m-n|}\right)\right]$$

By adding and subtracting the m=n terms, which constitutes no change to the value of the expression, the following is obtained, $$\Phi_{G_{nonsolar},n} = \frac{1}{2}\Phi_{bb}(1-T)\left[T^{n-1} + T^{N-n} - T^{-1} + T^0 + \sum_{m}\left(T^{|m-n|-1} - T^{|m-n|}\right)\right]$$

Expand both terms in the sum, which is bounded from m=1 to m=N with no excluded terms, $$\sum_m T^{|m-n|-1} =$$
$$T^{n-2} + T^{n-3} + \ldots + T^1 + T^0 + T^{-1} + T^0 + T^1 + \ldots T^{N-n-2} + T^{N-n-1}$$
$$\sum_m T^{|m-n|} = T^{n-1} + T^{n-2} + T^{n-3} + \ldots + T^1 +$$
$$T^0 + T^1 + \ldots + T^{N-n-2} + T^{N-n-1} + T^{N-n}$$

And evaluate the full sum as follows, $$\sum_m \left(T^{|m-n|-1} - T^{|m-n|}\right) = -T^{n-1} + T^{-1} + T^0 - T^{N-n}$$

This allows for simplification to obtain the final expression, $$\Phi_{G_{nonsolar},n} = \frac{1}{2}\Phi_{bb}(1-T)[T^{n-1}+T^{N-n}-T^{-1}+T^0-T^{n-1}+T^{-1}+T^0-T^{N-n}]$$

$$\Phi_{G_{nonsolar},n} = \Phi_{bb}(1-T) = -\Phi_{R_{rad},n}$$

Therefore, the system obeys detailed balance in the dark for photon absorption and emission with the thermal bath.

Results and Discussion

Figure 3A:
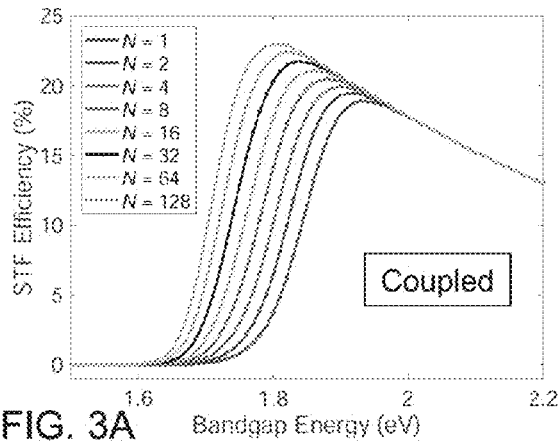

A schematic of the solar fuels modeling domain consisting of an ensemble of optically thin light-absorbers is shown in FIG. 1. FIG. 3A reports the STF efficiency as a function of the bandgap energy for varied number of light-absorbers, N, using the baseline parameters discussed in the Methods section. It shows that STF efficiencies for a single light-absorber (N=1) substantially increase when the light-absorber is split into thinner, yet equal-sized, light-absorbers (N>1) that each drive overall water electrolysis. For bandgap energies in the range of 1.6-2.0 eV, STF efficiencies increase approximately logarithmically as a function of N, FIG. 3B, and the maximum STF efficiency occurs at smaller bandgap energies. This means that incident photons are better utilized when multiple small-bandgap light-absorbers are present. To understand this behavior, the cause of the shape of the N=1 data is briefly explained. In order to provide any current density in the fuel-forming direction, an absorber must generate an open-circuit photovoltage ($V_{oc,n}$) that exceeds the thermodynamic potential of the fuel-forming reactions. To drive water electrolysis at room temperature and standard state conditions, which requires $V_{oc,n}>$ 1.23 V, the minimum bandgap energy for a single light-absorber is 1.52 eV. For bandgap energies between 1.52 eV and the maximum STF efficiency value of 1.93 eV, the absorber can generate enough potential to drive the reactions, but the Butler-Volmer relationships limit the operating potential to values close to $V_{oc,n}$, such that a substantial number of excited charge carriers recombine. In this case the light-absorber is potential-limited. Beyond 1.93 eV, the light-absorber generates enough potential that it operates very close to its short-circuit photocurrent density, defined as the current density generated under a zero-resistance electrochemical load. In this case the light-absorber is current-limited, and every increase in the energy of the bandgap results in fewer absorbed photons and therefore a lower operating current density.

Increases in STF efficiency caused by using multiple light-absorbers (N>1) vs. a single light-absorber (N=1) only occur in the potential-limited regime and not in the current-limited regime. The lack of an improvement in the current-limited regime occurs because each light-absorber operates very close to its short-circuit photocurrent density for all values of n and N. This means that in all cases the total operating current density from the N light-absorbers, as a flux, is approximately equal to the total flux of absorbed photons, which is independent of the value of N, meaning that STF efficiency is also independent of the value of N. Increases in STF efficiency in the potential-limited regime are caused by a convolution of two effects. The first effect is optical thinning, where partial solar light absorption by each absorber in the stack results in differences in the relative locations and shapes of the semiconductor photodiode j-V relationships (power curves) in relation to the fixed electrocatalytic Butler-Volmer j-V relationships (load curve). The other beneficial effect of having multiple light-absorbers is due to photon recycling, where a fraction $\phi_{em}$, of the difference between the operating current density and the current density due to sunlight absorption, each as a flux, is reemitted such that other absorbers in the stack are able to reabsorb this radiation. In this case, the percent of photons incident on the ensemble that are ultimately utilized for chemical reactions increases.

Enhancement of the STF efficiency with large N is unique to solar fuels constructs because STF efficiency is only dependent on the operating current density, which is dictated by a fixed electrochemical load. This differs from the parameters that dictate the efficiency of solar cells as a function of N (FIGS. 4A-4C) that are instead dependent on the maximum product of both the operating current density and the operating potential and therefore are not constrained by a specific load curve. An important conclusion from these models and parameters is that solar cells benefit from small values of N while solar fuels constructs benefit from large values of N.

Figure 3B:
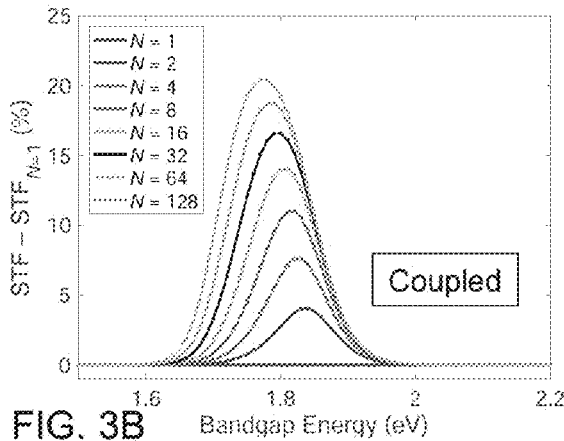
Figure 3C:
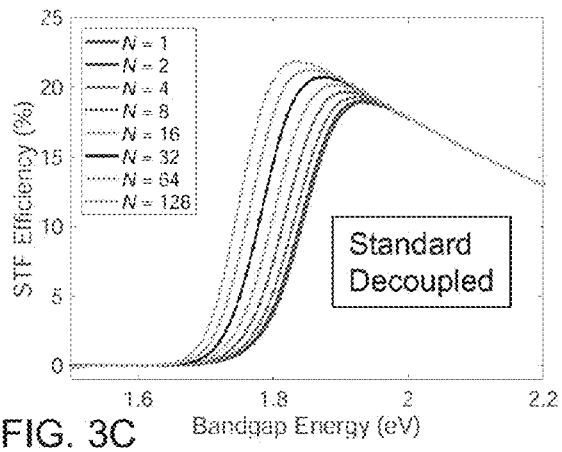
Figure 3D:
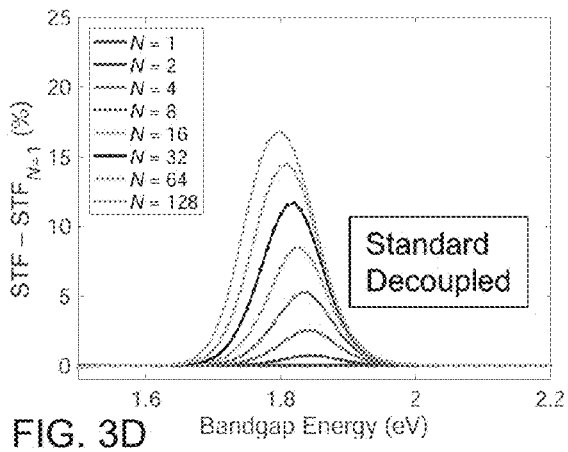
Figure 3E:
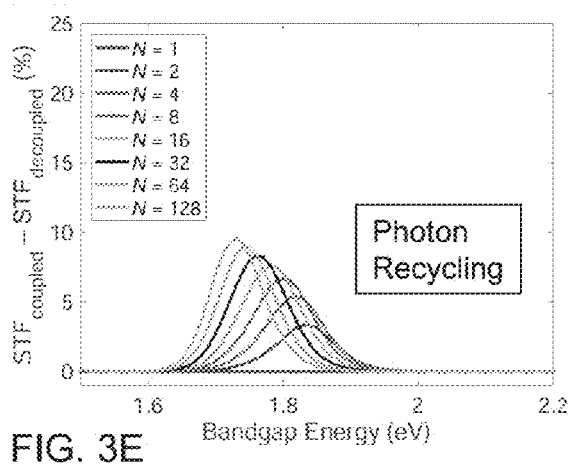

The influence that optical thinning and photon recycling have on STF efficiency can be isolated by comparing the results obtained from the coupled model (FIG. 3A) to the results obtained using the standard decoupled model (FIG. 3C), where there is no radiative coupling between light-absorbers. Effects due solely to optical thinning are shown in FIG. 3D and effects due solely to photon recycling are shown in FIG. 3E, which was calculated by taking the difference of the STF efficiencies for the coupled model and the standard decoupled model. These figures clearly show that the beneficial effects of both optical thinning and photon recycling on STF efficiency are largest in the potential-limited region. This is because for bandgap energies in this range the operating potential is close to $V_{oc,n}$, where the magnitude of the slope of the power curve is large and $\phi_{int,n}$ is small, meaning that many absorbed photons are reemitted.

Figure 3F:
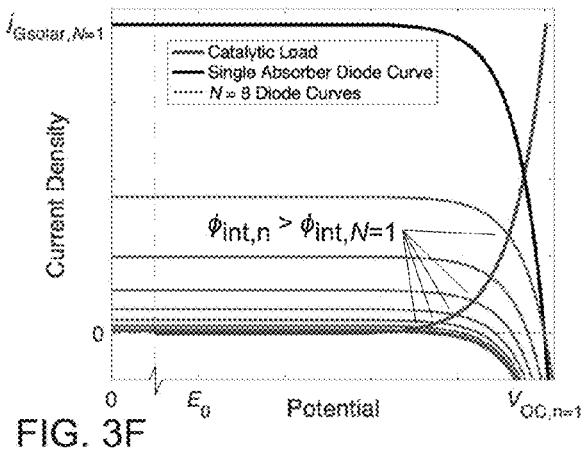
Figure 4A:
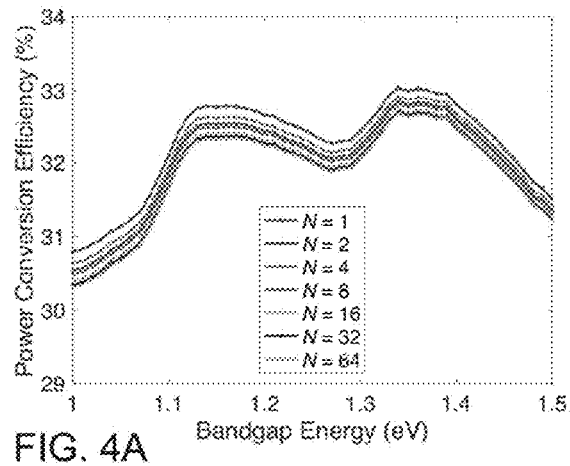
Figure 4B:
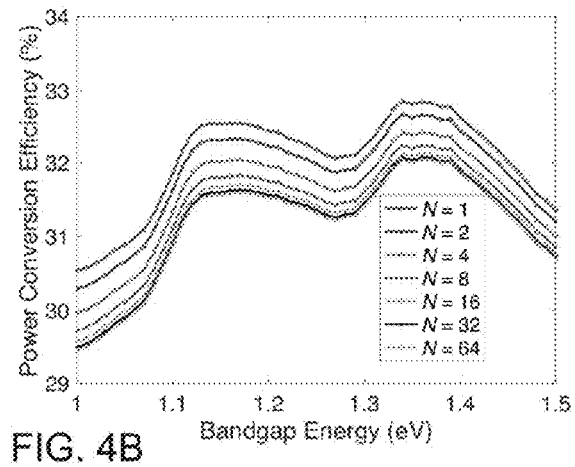
Figure 4C:
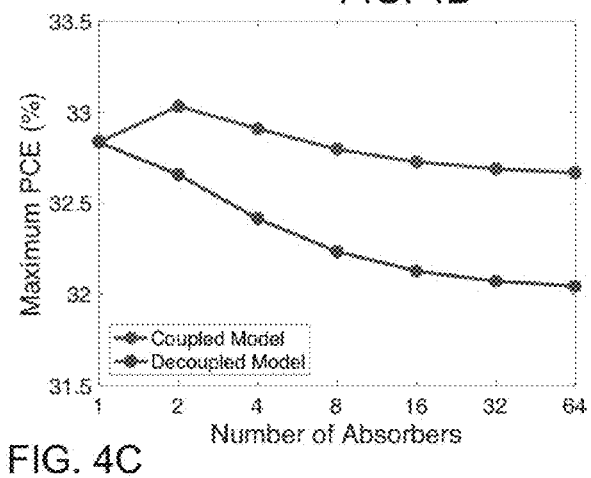

The effect of optical thinning is most apparent for the first light-absorber, where both terms in the ratio $$\frac{j_{G_{solar},n}}{j_{G_{bb}}}$$

decrease by the same amount, because the rate-limiting recombination current density in the standard decoupled model has the same dependence on optical thickness as sunlight absorption. This means that, neglecting photon recycling, $V_{oc}$ for the top light-absorber, $V_{oc,1}$, is independent of absorptance and therefore independent of N (FIG. 3F). As N increases the amount of sunlight absorbed by the top light-absorber decreases, yet $V_{oc,1}$ remains unchanged and therefore, the power curve for the top light-absorber and the load curve intersect at a current density that is closer to its short-circuit photocurrent density. This results in a larger value for the internal quantum yield, $\phi_{int,1}$ meaning that photons are more effectively utilized by the top light-absorber. Sunlight absorption exponentially decreases with n due to light attenuation from Beer-Lambert law absorption by light-absorbers 1 through (n−1), while the rate-limiting recombination current density remains unchanged from its value for the top light-absorber, resulting in $V_{oc,n}$ values that decrease approximately linearly with n. Each light-absorber in the stack exhibits improved $\phi_{int,n}$ until the limiting condition when $V_{oc,n}$ is less than $E_0$ or the slope of the load curve is sufficiently large, which occurs when electrocatalysis is fast due to large exchange current densities and large charge-transfer coefficients.

The effect of optical thinning on STF efficiency has a complex dependence on numerous parameters and the extent to which it contributes to improved STF efficiency varies for each value of $E_g$, N, and n. In order to visualize this complex dependence, FIGS. 3A-3F present maps for the N=128 case showing various current density terms as a function of the absorber number and the bandgap energy for both the coupled and standard decoupled models. The current densities represent those due to absorption of photons emitted by other absorbers and the thermal bath, $j_{G_{nonsolar},n}$ (FIG. 3A; coupled model), absorption of incident solar photons, $j_{G_{solar},n}$ (FIG. 3D), radiative recombination, $j_{R_{rad},n}$ (FIG. 3B, 3E), and net operating current density, $j_{rxn,n}$ (FIG. 3C, 3F). Comparing the three maps generated using the coupled model, it is apparent that at small bandgap energies, large rates of photon recycling (FIG. 3A) and absorption of incident solar photons (FIG. 3D) are almost completely negated by equally large rates of radiative recombination (FIG. 3B, 3C). This is also true for small bandgap energies in the standard decoupled model in the absence of photon recycling (FIGS. 3D-3F). Collectively, the data show that almost all fuel-forming current density is provided by light-absorbers located in the top half of the stack, which makes sense because the top half of the stack absorbs 90% of the incident sunlight while the bottom half of the stack absorbs only 9% of the incident sunlight.

Figure 5A:
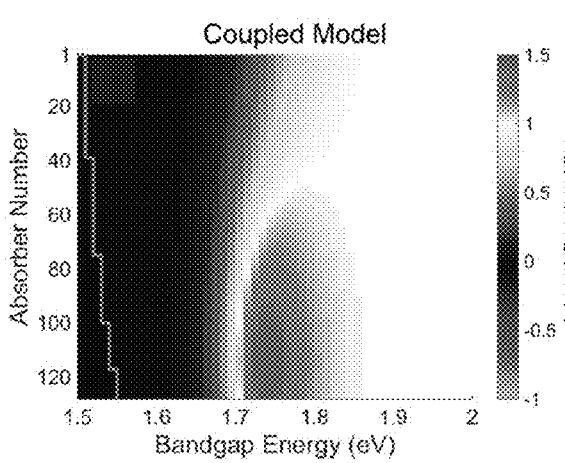
Figure 5B:
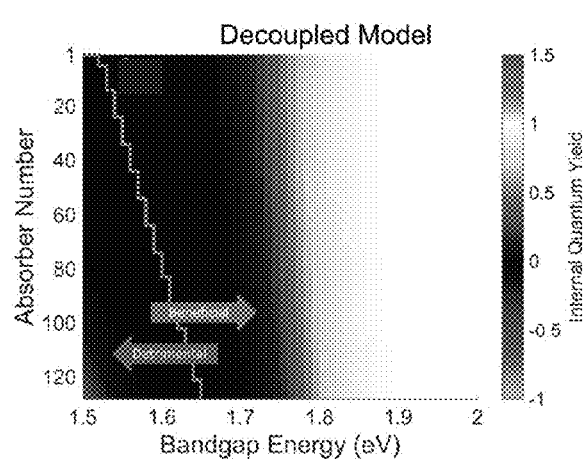
Figure 6A:
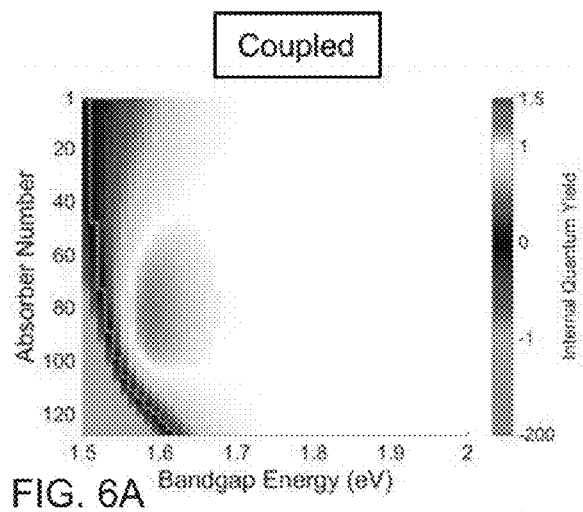
Figure 6B:
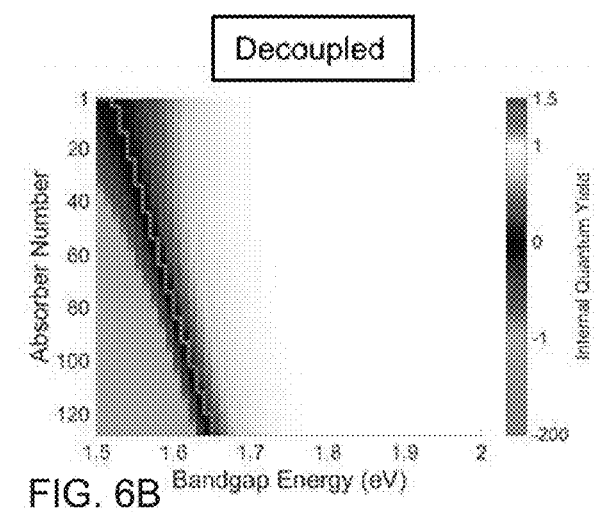
Figure 6C:
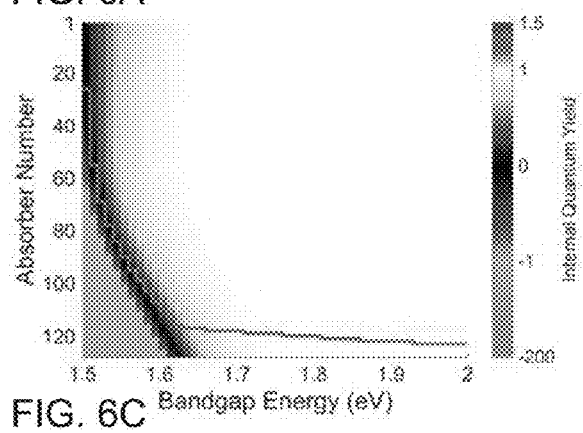
Figure 6D:
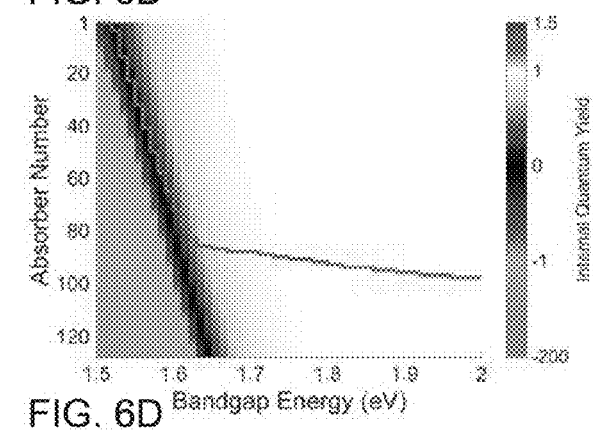
Figure 6E:
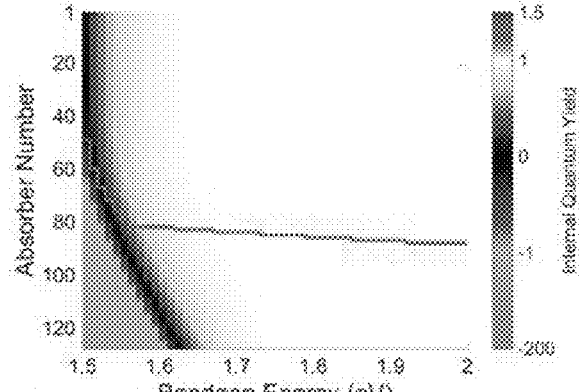
Figure 6F:
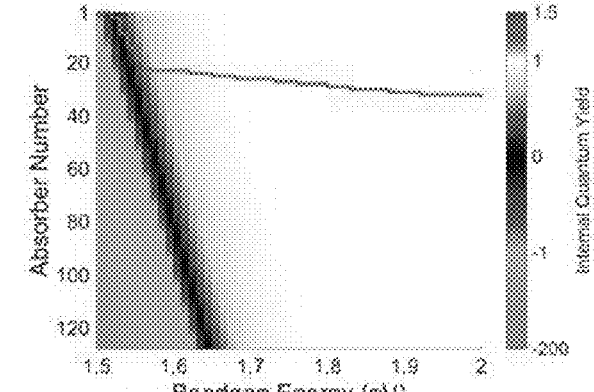

The effectiveness of a light-absorber to convert absorbed solar photons into fuel is quantified using the internal quantum yield, $\phi_{int,n}$. If $\phi_{int,n}$ is larger than $\phi_{int,N=1}$ for the single-absorber case, then that light-absorber contributes to increasing the ensemble STF efficiency, while if $\phi_{int,n}$ is smaller than $\phi_{int,N=1}$, then that light-absorber is detrimental. FIGS. 5A-5B present maps of $\phi_{int,n}$ for the N=128 case as a function of the absorber number and the bandgap energy for the coupled model and standard decoupled model, respectively. Above and to the right of the green lines are regions where $\phi_{int,n}$ is larger than $\phi_{int,N=1}$, which constitutes the majority of the plot. In the coupled model, $\phi_{int,n}$ can exceed 1 because of photon recycling, which occurs most substantially for light-absorbers located deeper in the stack, because the amount of sunlight available to these light-absorbers is so small that minor changes in the number of available photons has a large impact on the operating current density. In agreement with FIG. 3E, photon recycling has a net beneficial effect only for bandgap energies in a narrow range near 1.75 eV.

Below and to the left of the green lines are regions where $\phi_{int,n}$ is smaller than $\phi_{int,N=1}$, which only occurs for light-absorbers that are located near the bottom of the stack and/or have bandgap energies that are close to the minimum potential requirement. This results in operating current densities that are very close to zero or smaller than zero, meaning that the light-absorber performs the net undesired back-reaction corresponding to galvanic fuel consumption. Galvanic behavior occurs when the open-circuit photovoltage is smaller than the formal potential of the fuel-forming reaction ($V_{oc,n} < E_0$), which leads to the power and load curves intersecting at negative values of current density. As long as electrocatalysis of the fuel consumption reaction is sufficiently slow, these negative operating current densities are negligible and the total operating current density from the ensemble of N absorbers is dictated by light-absorbers located near the top of the stack. However, for conditions where fuel consumption occurs more rapidly due to faster rates of electrocatalysis (FIGS. 6A-6F), many light-absorbers exhibit values of $\phi_{int,n}$ that are smaller than $\phi_{int,N=1}$ and the behavior becomes less dependent on the bandgap energy. In these cases, optimization of the STF efficiency requires that the total number of light-absorbers and amount of light-absorbing material decreases by removing absorbers near the bottom of the stack. While this sacrifices light absorption, it provides a net benefit by eliminating the portion of the stack that performs the net undesired back-reaction.

Figure 7A:
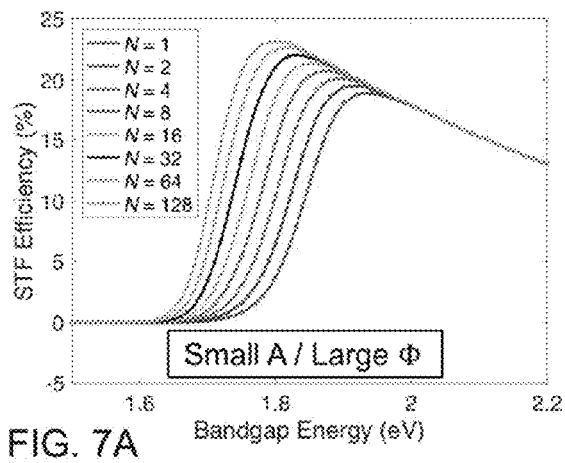
Figure 7B:
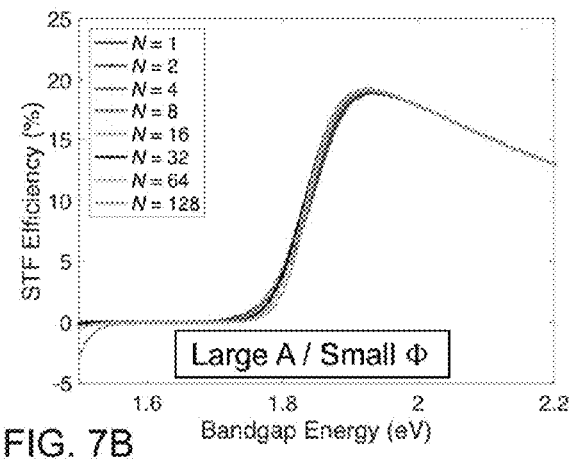
Figure 7C:
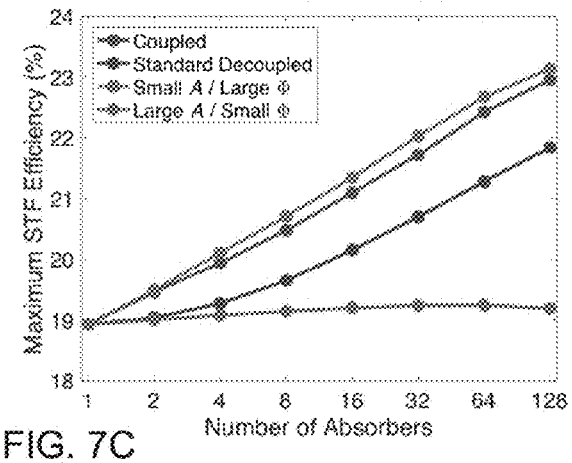
Figure 8A:
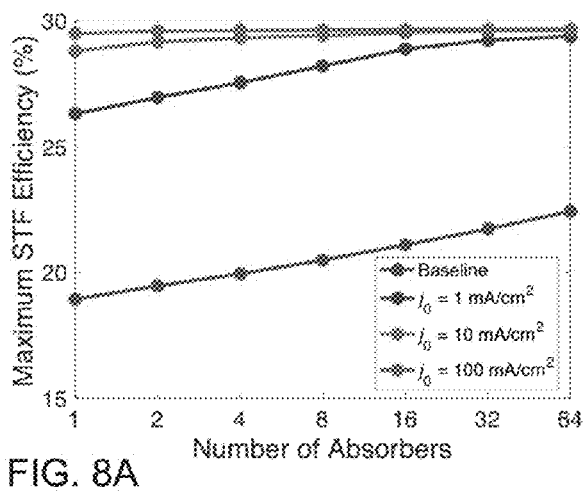
Figure 8B:
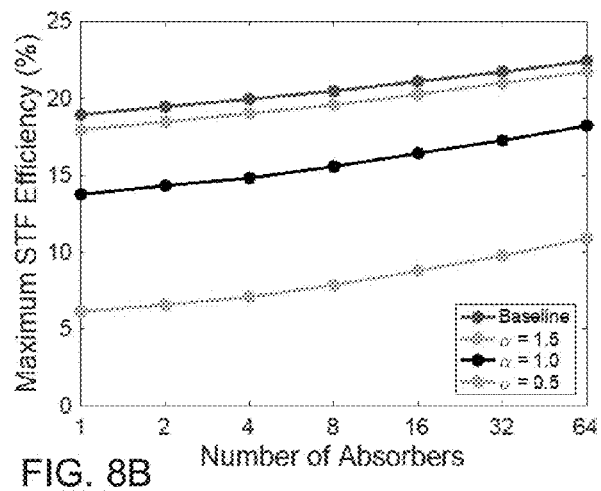

To independently examine the behavior of light-absorbers near the top of the stack (n close to 1) and the behavior of light-absorbers located deeper in the stack (n close to N), two decoupled models were introduced, each with uniform photon absorption. Light-absorbers near the top of the stack are well-described by the small A/large Φ model (FIG. 7A) while light-absorbers near the bottom of the stack are well-described by the large A/small Φ condition (FIG. 7B). The small A/large Φ model mimics exactly the effects that occur in the standard decoupled model for the top absorber in the stack (n=1). This is because in both cases, the ratio is a constant as a function of N and therefore, $V_{oc,1}$ is independent of the value of N. This, coupled with a lower short-circuit photocurrent density than in the single-absorber case, guarantees that $\phi_{int,1}$ increases in the potential-limited regime. The large A/small Φ model captures effects that occur in the standard decoupled model for light-absorbers located deeper in the stack. These light-absorbers have the same rate-limiting recombination current density as the top light-absorber in the stack but sunlight absorption is significantly decreased and therefore, V, is smaller than $V_{oc,1}$. In the large A/small Φ model, changing N causes the short-circuit photocurrent density and $V_{oc,N}$ to scale with the same functional relationship as the operating current density and the overpotentials in the Butler-Volmer equation. This scaling relationship is also captured in the standard decoupled model, but the scaling occurs with changing n, not N. Comparing the decoupled models, at each bandgap energy the STF efficiency is largest for the small A/large Φ model, followed by the standard model, followed by the small A/large Φ model (FIG. 7C). When photon recycling is included in the analysis via the coupled model, STF efficiencies for each bandgap energy are larger than in the absence of photon recycling in the standard decoupled model.

Figure 9A:
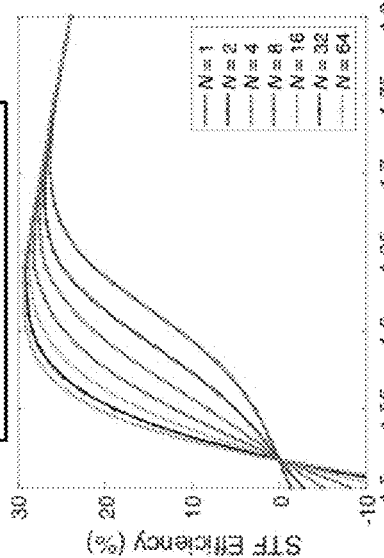
Figure 9B:
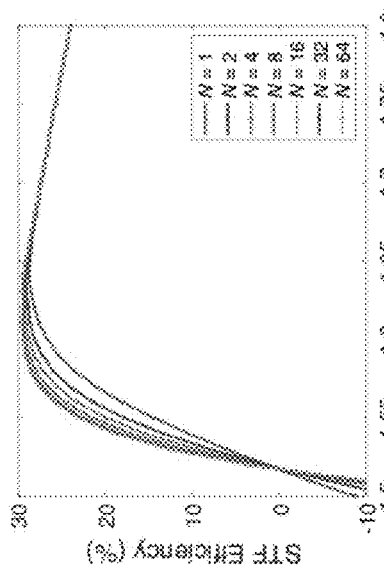
Figure 9C:
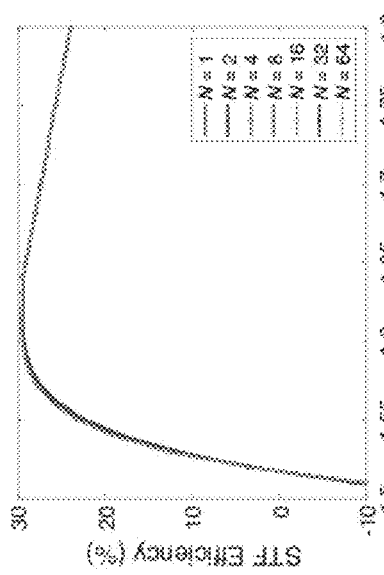
Figure 9D:
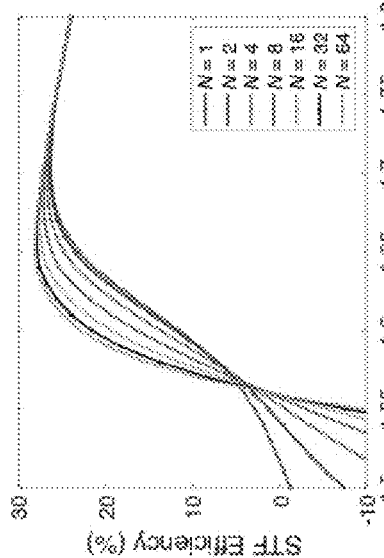
Figure 9E:
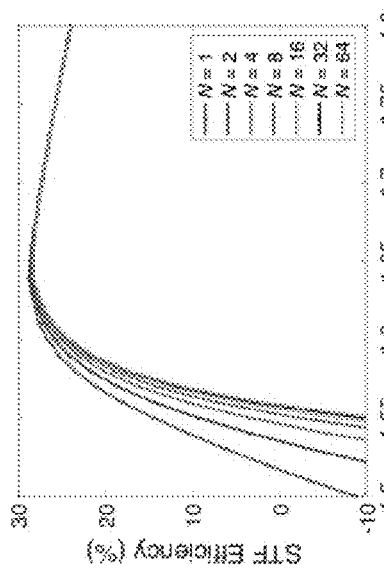
Figure 9F:
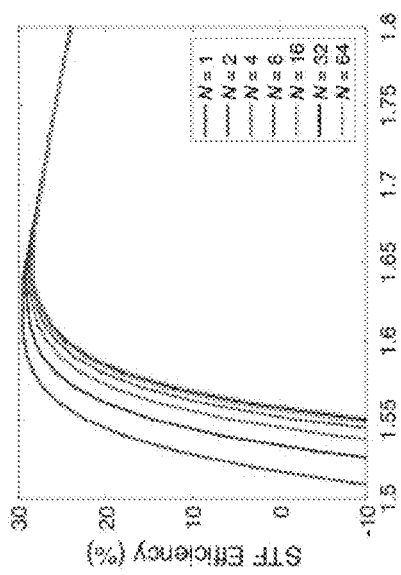

To better understand the role that the electrocatalytic parameters of the hydrogen-evolution reaction and the oxygen-evolution reaction have on the STF efficiency, several sets of parametric sweeps were performed for the coupled model (FIGS. 8A-8B) and all four models (FIGS. 6A-6F and 9A-9O). FIGS. 9A-9O models the effect of more efficient electrocatalysis by increasing both exchange current densities to 1, 10, or 100 mA/cm². These exchange current densities are all larger than the value used in the base case of $j_0^{red}$=0.15 mA/cm² for the hydrogen-evolution reaction at Pt and many orders of magnitude larger than the rate-limiting value used in the base case of j=3.3×10$^{-6}$ mA/cm² for the oxygen-evolution reaction at RuO$_2$. The largest value of 100 mA/cm² is within the range of values reported for one of the fastest known electrochemical redox reactions: outer-sphere single-electron-transfer between Pt and [Fe(III/II) (CN)$_8$]$^{3-/4-}$ dissolved in aqueous electrolyte. For this exchange current density of 100 mA/cm², no models result in increases in the STF efficiency when an ensemble of multiple light-absorbers is used. Results from the decoupled model with large A/small Φ indicate that larger exchange current densities lead to net fuel consumption from light-absorbers located near the bottom of the stack, even with bandgap energies larger than 1.6 eV (FIGS. 9J-9L). However, as described above, the net behavior for the standard decoupled model (FIGS. 9D-9F) is dominated by light-absorbers near the top of the stack, because they absorb the majority of the incident sunlight, which is evident by the similarity of the results for this model and the results from the decoupled model with small A/large Φ (FIGS. 9G-9I). These net effects still result in smaller STF efficiencies when multiple light-absorbers are used but they can be entirely counteracted by photon recycling. This is clear from results of the coupled model (FIGS. 9A-9C) where STF efficiency is independent of the number of absorbers when the exchange current densities are 100 mA/cm² (FIG. 9C). When the exchange current densities are decreased from this value by even an order-of-magnitude, STF efficiencies increase when multiple light-absorbers are used.

Figure 10G:
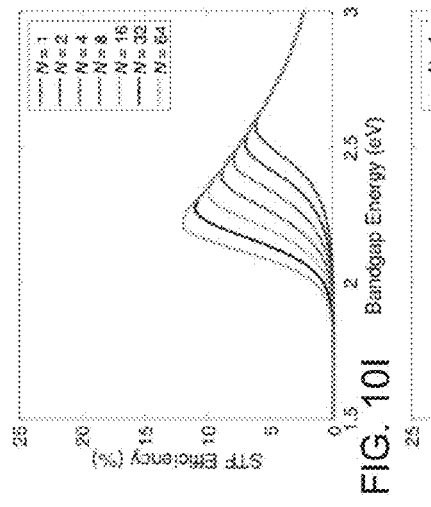
Figure 10J:
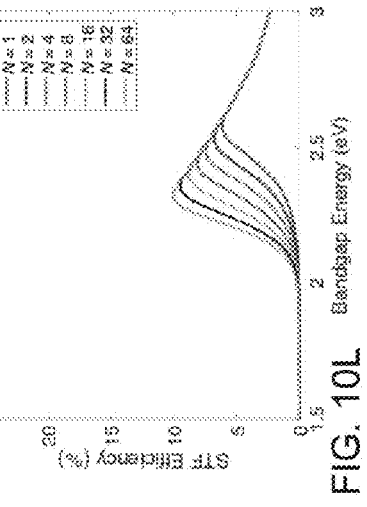
Figure 10M:
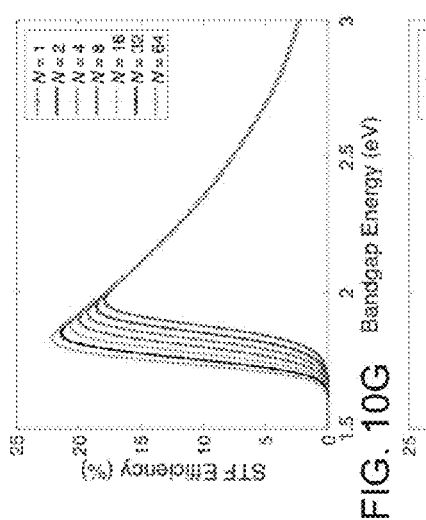
Figure 10H:
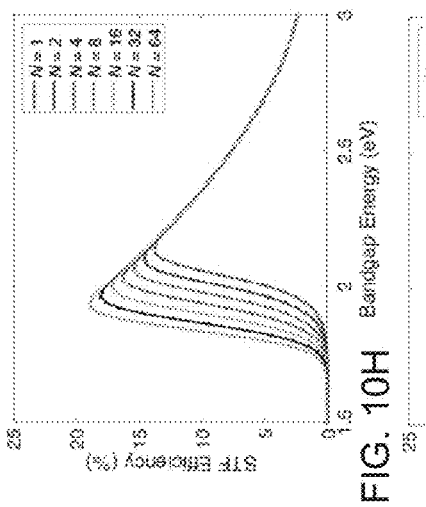
Figure 10K:
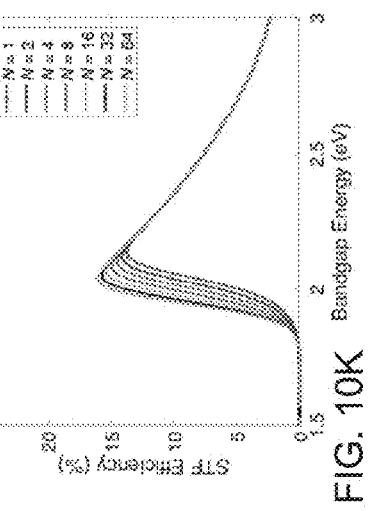
Figure 10N:
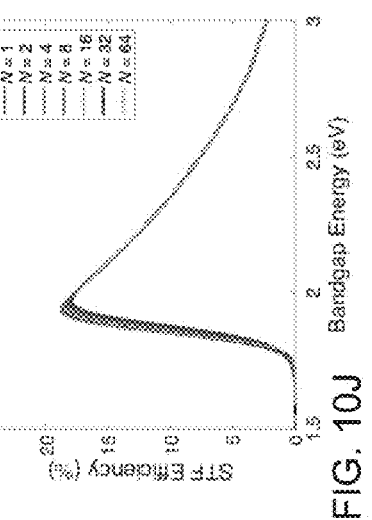
Figure 10I:
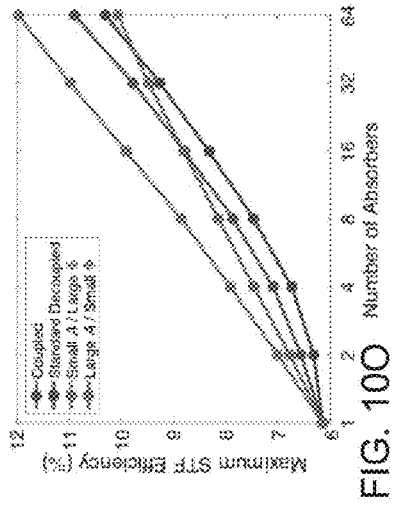
Figure 10L:
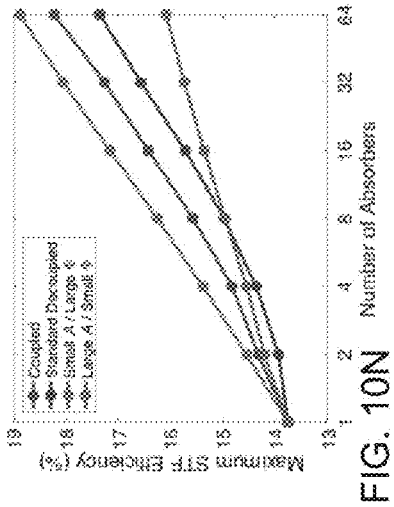
Figure 10O:
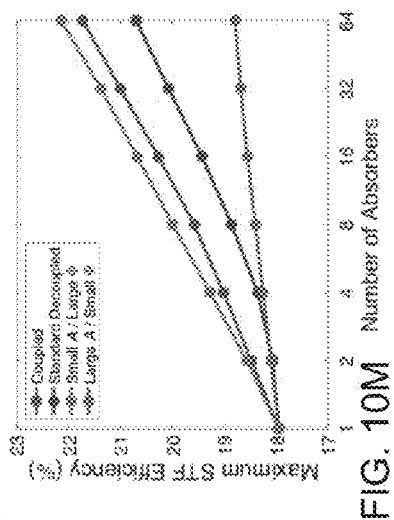

The data in FIGS. 9A-9O suggest that for reactions with large exchange current densities, meaning faster rates of electrocatalysis, multiple light-absorbers provide little benefit to STF efficiencies. FIGS. 10A-10O model the effect of slower rates of electrocatalysis by decreasing all charge-transfer coefficients to 1.5, 1.0, or 0.5, which represents less-efficient electrocatalysis. These charge-transfer coefficients are all smaller than values used in the base case, and the smallest value of 0.5 is that for an ideal outer-sphere single-electron-transfer reaction. Results from the decoupled model with large A/small Φ, whose behavior best represents that of light-absorbers located near the bottom of the stack, indicate that only for the largest charge-transfer coefficients does having multiple light-absorbers provide little benefit to the STF efficiencies (FIGS. 10J-10L) but that this benefit increases only slightly in the decoupled model with small A/large Φ (FIGS. 10G-10C). In general, these two models effectively predict the trend in STF efficiencies for the standard decoupled model (FIGS. 10D-10F) and as expected inclusion of photon recycling is beneficial (FIGS. 10A-10C). Collectively these data show that for slow rates of electrocatalysis, like when driving water electrolysis, CO$_2$ reduction, or N$_2$ fixation, having more light-absorbers leads to increased STF efficiencies as a function of bandgap energy.

The maximum STF efficiency for water electrolysis is ~31% under standard-state conditions at room temperature and assuming no electrocatalytic overpotentials, meaning infinite exchange current densities. However, the maximum STF efficiency assuming state-of-the-art electrocatalytic parameters is in the range of 15-20% depending on the exact model parameters chosen. The large discrepancy in these values is predominantly a consequence of poor catalysis of the oxygen-evolution reaction. Herein the present invention demonstrates that even in the absence of breakthroughs in oxygen-evolution electrocatalysis, limitations imposed by the slow rate of oxygen evolution can effectively be overcome through utilization of multiple light-absorbers. Increasing the number of light-absorbers leads to a shift in the maximum STF efficiency toward its maximum theoretical value and therefore represents a promising way to develop high-efficiency solar water electrolysis devices.

Figures 11A, 11B, 11C, 11D, 11E, 11F:
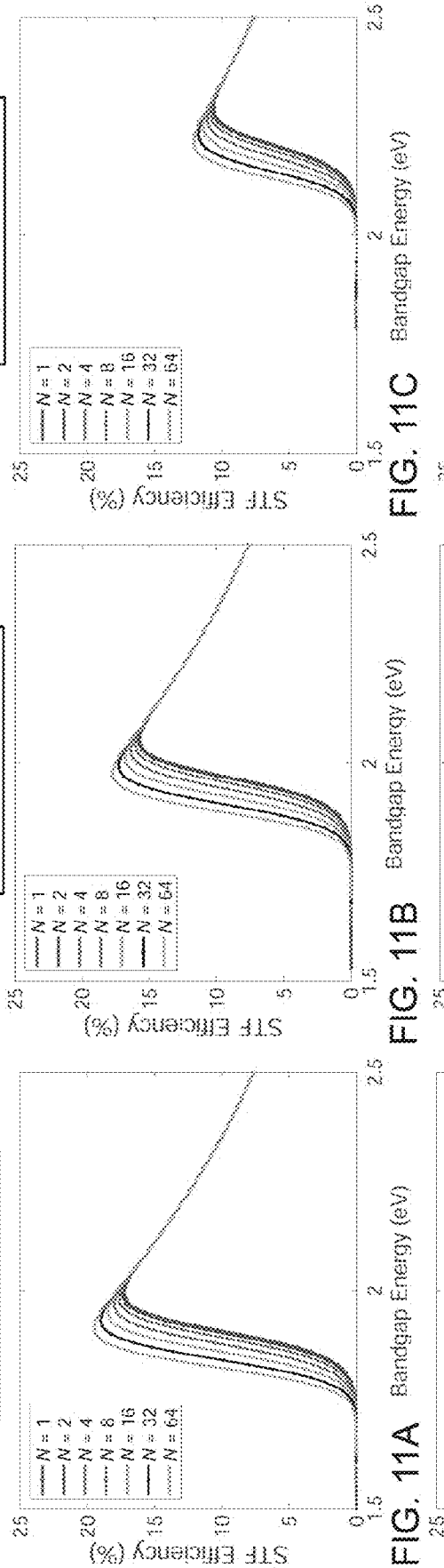

The fraction of radiative recombination, $\phi_{em}$, is one of the most important parameters in determining the maximum efficiency of a solar fuels device. FIGS. 11A-11U show the STF efficiency vs. the bandgap energy for varied N and varied $\phi_{em}$, assuming the coupled model. While the maximum STF efficiencies for each N scale approximately logarithmically with $\phi_{em}$, for each value of $\phi_{em}$ the improvement in STF efficiency for successively larger N still occurs with the same magnitude. Thus while larger $\phi_{em}$ always leads to larger STF efficiency, the benefits of a large number of light-absorbers are also observed in cases of high rates of bulk non-radiative recombination and surface recombination through midgap states. State-of-the-art GaAs solar cells and solution-processed organic-inorganic hybrid halide perovskite solar cells have achieved near unity values of $\phi_{em}$. However, for solar cell materials, there is a range of values for $\phi_{em}$ that span over ten orders-of magnitude. In particular, devices that incorporate nanomaterials typically have low values of $\phi_{em}$ because of the dramatic increase in the number of surface trap states due to the presence of large surface areas, although radiative recombination fractions on the order of 10$^{-4}$ have recently been reported for inorganic perovskite quantum dot solar cells. These quantum dots can be prepared using low-cost, facile synthesis methods with bandgaps that are easily tunable within the ranges of optimal STF efficiency over a wide range of N and $\phi_{em}$. Water-stable colloidal suspensions of these quantum dots prepared with ligands that perform or mediate solar fuels electrocatalysis are direct manifestations of the present invention with an extremely large number of light-absorbers.

Hybrid organic-inorganic halide perovskite materials, which are grown using low-temperature, solution-processed techniques, have been used as the light-absorber in solar cells with >20% efficiency and tandem solar water-electrolysis devices with >12% STF efficiency. While the most efficient halide perovskite materials have bandgap energies that are slightly too small to drive water electrolysis and related solar fuels reactions at large rates, their bandgap energies are highly tunable in the range of 1.5-2.3 eV via partial substitution of $I^-$ with $Br^-$. Moreover, these materials have been reported to have $\phi_{em}$ values that range from near unity to several orders-of-magnitude below unity, both conditions that would result in large gains in STF efficiency by increasing the number of light-absorbers in the ensemble. Experimentally, this can be accomplished by decreasing the thickness of the light-absorber, which is facile with the solution-processed techniques used to fabricate these materials. Assuming that issues of water instability can be overcome, such as by use of surface protection, these materials represents a direct pathway to a single-material, low-cost, high-efficiency solar-to-fuel device.

Figures 11G, 11H, 11I, 11J, 11K, 11L:
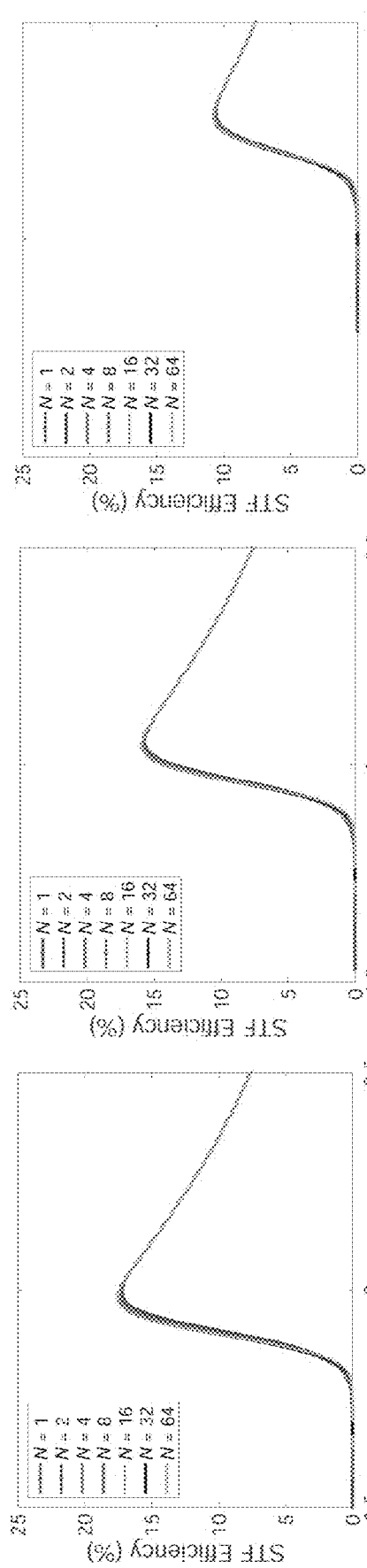

For many semiconductors, non-radiative recombination is facilitated by surface trap states and therefore the rate of recombination is determined by the surface area of the semiconductor-solution interface and not the volume of the semiconductor. When recombination is limited by shallow surface states, STF efficiency remains unchanged, even for large numbers of light-absorbers (FIGS. 11G-11I). However, for reactions other than water electrolysis that have smaller charge-transfer coefficients, STF efficiencies increase when multiple light-absorbers are used, even when recombination via surface states (shallow or midgap) dominates (FIGS. 11M-11R). Smaller charge-transfer coefficients approaching 0.5 are likely to be observed for facile redox reactions, such as those desired for direct solar-driven redox flow batteries and related concepts that utilize rapid solar energy conversion and storage with time-shifted hydrogen-evolution and oxygen-evolution electrocatalysis in the dark. These concepts suggest that light-absorbers with recombination dominated by surface trap states can be quite beneficial to STF efficiency as the number of light-absorbers increases. In accordance with the present invention, the ideal material has a tunable particle size, tunable direct bandgap, large quantum yield for emission, and is stable in an aqueous environment.

The central cause of the enhancement in STF efficiencies with increased number of light-absorbers shown in this work is due to better load matching between the power curves and load curve. This is accomplished by altering the power curves through optical thinning. An alternative design alters the load curve by increasing the surface area of the electrocatalyst-solution interface. The resulting enhancement in STF efficiency is fully captured by the decoupled model with small A/large Φ, with N equal to the roughness factor of the electrocatalysts. Under most cases, this model showed the largest enhancement in STF efficiencies as the number of light-absorbers increased out of any of the models. Notwithstanding, there are benefits to using multiple light-absorbers instead of increasing electrocatalyst loading. For example, most electrocatalysts absorb sunlight and therefore, minimizing the total thickness of the electrocatalysts is critical to obtaining large STF efficiencies. Moreover, the largest ratio of surface area to mass loading is obtained by coating semiconductor surfaces in monolayers of electrocatalysts, which can be accomplished in photocatalyst designs using facile photochemical deposition routes. However, for single light-absorbers, the mass loading of the electrocatalysts would have to be substantially larger in order to maintain structural integrity of the porous electrocatalysts, which would also greatly increase parasitic light absorption. Having multiple light-absorbers is also beneficial because each light-absorber operates at a smaller current density and therefore resistive potential losses and species mass transport are less likely to limit performance in comparison to mesoporous electrocatalyst layers, where even forced convection within the pores will be difficult. Moreover, the thinness of each light-absorber facilitates rapid charge separation and the large surface-area-to-volume ratios imply that little electrocatalyst must be used. The presence of sub-monolayer amounts of electrocatalyst can enhance photoelectrochemical effects due to formation of large barrier heights at semiconductor-solution contacts where lower-barrier electric potential drops formed due to equilibration with electrocatalysts can be "pinched off."

As described herein, the present invention demonstrated that through photon recycling and optical thinning, an ensemble of optically stacked thin light-absorbers can have substantially increased solar-to-fuels efficiency when compared to a single absorber. Poor catalysis, which has been one of the major barriers to solar fuels applications such as water electrolysis, can be overcome by selecting from a large number of light-absorbers with near-optimal bandgaps. An enhancement in the solar-to-fuel efficiency can occur when multiple light-absorbers are used even when the dominant recombination mechanism is a non-radiative bulk or surface process.

Figure 14:
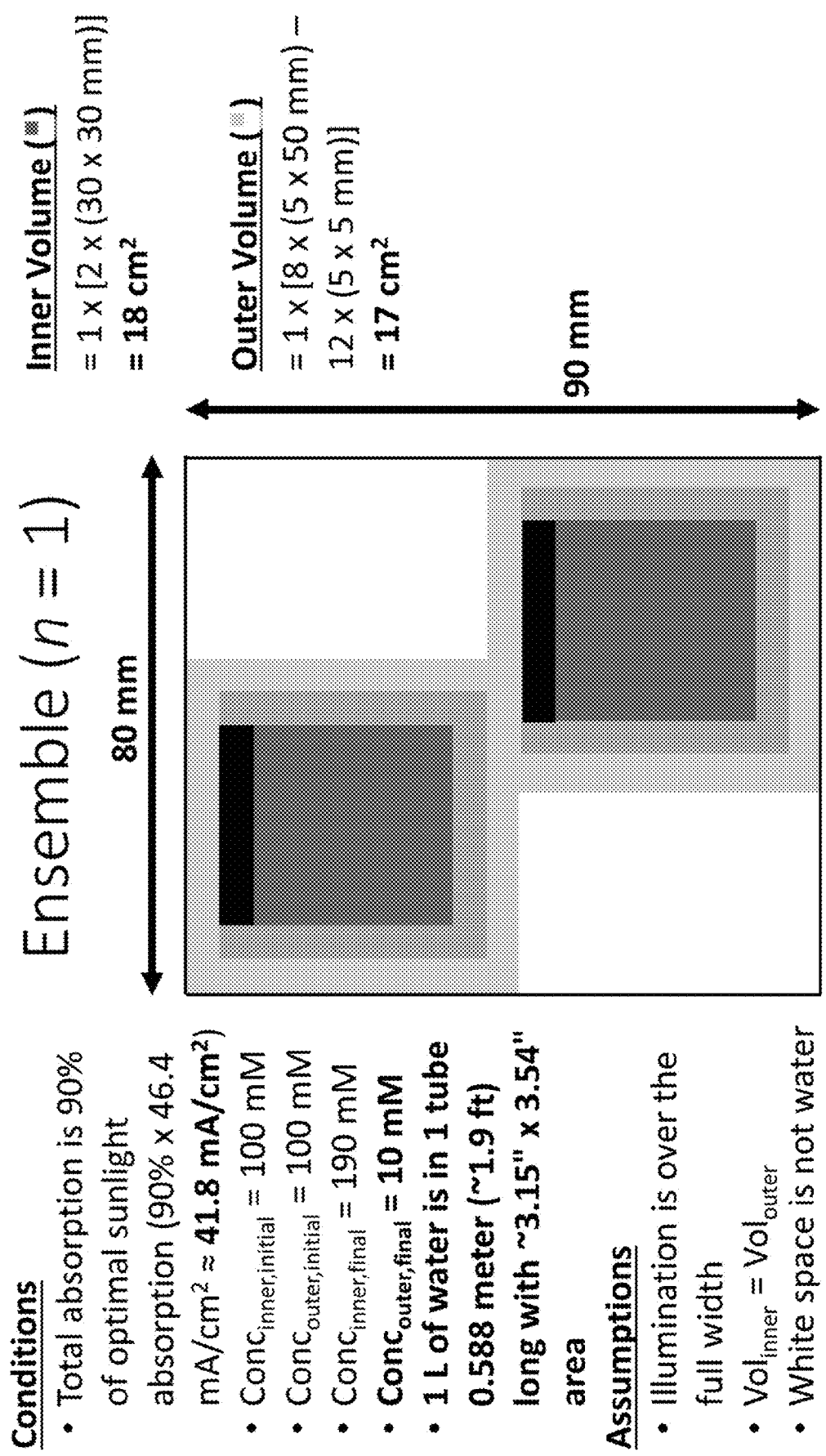
Figure 16:
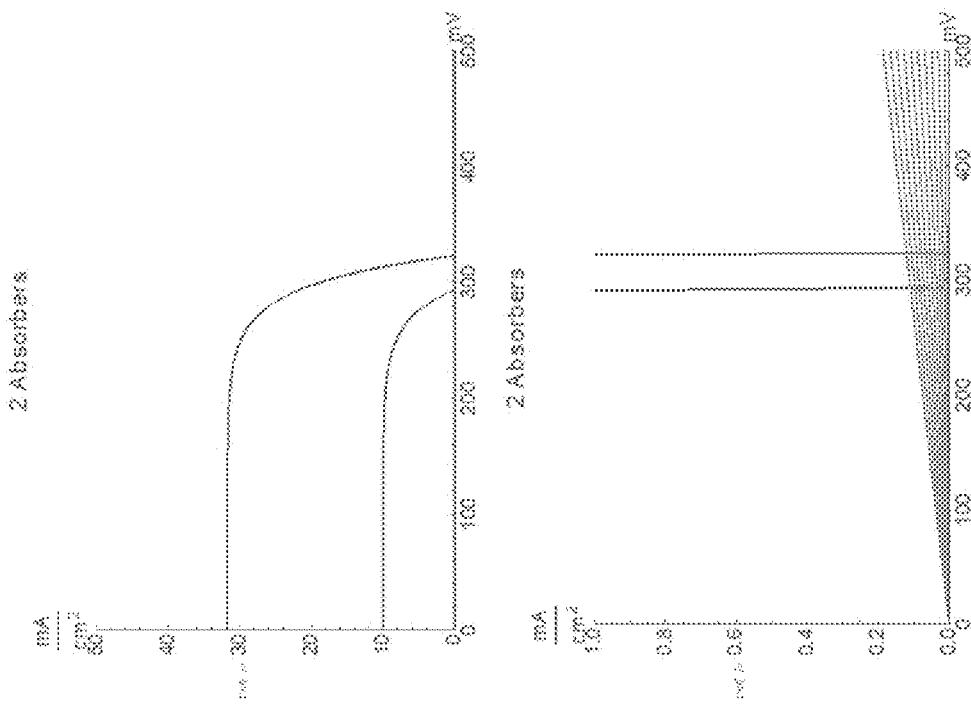
FIG. 16 shows power curves for an ensemble of light absorbers with n=2 and the load curves over time as the originally 100 mM salt water is desalinated into 10 mM salt water.

The above phenomena are also operative for light-driven ion pumping tubes that can be used to drive desalination of salt water. However, in that case, water is a poor light absorber, it has a relatively fast rate of charge recombination of solvated protons ($H^+$) and solvated hydroxides ($OH^-$) in bulk water, and photoacid or photobase dyes are needed to sensitize water to visible light absorption and photogeneration of mobile $H^+$ and $OH^-$. As such, models of sunlight-driven desalination assumed that charge recombination was effectively surface-limited or that optical thinning was accomplished by using dyes that absorb less sunlight or a lower concentration of dyes and not by varying the thickness of the aqueous protonic semiconducting region. This resulted in an open-circuit photovoltage that decreased from the base case as less light is absorbed, by 2.303RT/F=~60 mV per order-of-magnitude decrease in photon absorption rate. The cross-section of a single light-absorbing square tube is shown as FIG. 12 where a unit cell consists of two staggered tubes as shown in FIG. 14 and the dimensions shown are representative of the n=10 case shown in FIG. 13. Variations in the number of unit cells through the thickness of the device, n, result in scaling of all dimensions down by n such that the total volume of water remains approximately the same per cross sectional area. Using this model and similar to the results from the photochemical solar fuels model, simulations shown by FIGS. 15-21 that as n increases, the average total rate of desalination over time increases such that the time to desalinate the water from 100 mM to 10 mM decreases as shown by FIG. 22. A summary of the results for the time to desalinate, or percentage desalinated for the cases where the tube cannot fully desalinate the water, as a function of the open-circuit photovoltage of the single light absorber and the number of unit cells, n, is shown in FIG. 25. Scaling the dimensions of the n=10 base case down by a factor of 3 as shown in FIG. 23 results in a larger average total rate of desalinate over time such that the time to desalinate the water from 100 mM to 10 mM decreases as shown by FIG. 24.

As used herein, the term "about" refers to plus or minus 10% of the referenced number.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the below claims are solely for ease of examination of this patent application, and are exemplary, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A light-driven system (100) for driving water electrolysis, comprising a plurality of light-absorbing units (110) configured such that light goes through one light-absorbing unit to get to the next light-absorbing unit, wherein a non-electrically conductive phase is disposed between adjacent light-absorbing units, wherein each light-absorbing unit (110) operates independently and in parallel, thus being electronically decoupled from each other, to net drive water electrolysis, wherein the light-absorbing units (110) are comprised of a material having a 1.6-2.6 eV bandgap to drive water electrolysis.

2. The system (100) of claim 1, wherein the light-absorbing units (110) have near-optimal bandgaps that are about 0.25 eV to about 2.0 eV larger than a free energy required to drive water electrolysis.

3. The system (100) of claim 1 comprising N number of light-absorbing units (110), wherein each light-absorbing unit (110) is 1/N as thick as a single light-absorbing unit.

4. The system (100) of claim 3, wherein N ranges from 5-1,000.

5. The system (100) of claim 1, wherein a solar-to-fuel efficiency is increased by a factor of about 1.1 to 30 as compared to a single light-absorbing unit having the same amount of light-absorbing ability or material as the plurality of light-absorbing units (110).

6. The system (100) of claim 1, wherein the light-absorbing units (110) are comprised of perovskite materials and cast as photocatalyst sheets.

7. The system (100) of claim 1, wherein each light-absorbing unit (110) absorbs at least about 0.0001% of incident light.

8. The system (100) of claim 1, wherein each light-absorbing unit (110) is at least about 1 nm thick.

9. The system (100) of claim 1, wherein the plurality of light-absorbing units (110) comprises the same materials or different materials.

10. A light-driven system (100) for driving water electrolysis, comprising a plurality of light-absorbing units (110) configured such that light goes through one light-absorbing unit to get to the next light-absorbing unit, wherein each light-absorbing unit (110) operates independently and in parallel to net drive water electrolysis, wherein the plurality of light-absorbing units (110) are comprised of materials with the same bandgap.

11. A light-driven system (100) for driving water electrolysis, comprising a plurality of light-absorbing units (110) configured such that light goes through one light-absorbing unit to get to the next light-absorbing unit, wherein a non-electrically conductive phase is disposed between adjacent light-absorbing units, wherein each light-absorbing unit (110) operates independently and in parallel to net drive water electrolysis, wherein the light-absorbing units (110) have near-optimal bandgaps that are about 0.25 eV to about 2.0 eV larger than a free energy required to drive water electrolysis.

* * * * *